US009152232B2

(12) United States Patent
Hirose et al.

(10) Patent No.: US 9,152,232 B2
(45) Date of Patent: Oct. 6, 2015

(54) HAPTIC FEEDBACK DEVICE AND HAPTIC FEEDBACK METHOD

(71) Applicant: Panasonic Corporation, Osaka (JP)

(72) Inventors: Yoshifumi Hirose, Kyoto (JP); Shoichi Araki, Osaka (JP); Hidetomo Nagahara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 22 days.

(21) Appl. No.: 14/007,758

(22) PCT Filed: Jan. 16, 2013

(86) PCT No.: PCT/JP2013/000144
§ 371 (c)(1),
(2) Date: Sep. 26, 2013

(87) PCT Pub. No.: WO2013/114793
PCT Pub. Date: Aug. 8, 2013

(65) Prior Publication Data
US 2014/0071071 A1    Mar. 13, 2014

(30) Foreign Application Priority Data
Jan. 30, 2012  (JP) .................................. 2012-016632

(51) Int. Cl.
*G06F 3/16* (2006.01)
*G06F 3/01* (2006.01)
(Continued)

(52) U.S. Cl.
CPC .............. *G06F 3/016* (2013.01); *B06B 1/0269* (2013.01); *G06F 3/041* (2013.01); *G06F 3/044* (2013.01); *G06F 3/0488* (2013.01); *G10K 15/02* (2013.01)

(58) Field of Classification Search
CPC ................. G06F 3/016; G06F 3/043–3/0436; G06F 2203/014
See application file for complete search history.

(56) References Cited

U.S. PATENT DOCUMENTS 8,325,144 B1 * 12/2012 Tierling et al. ............... 345/173
2010/0141408 A1 *  6/2010 Doy et al. .................. 340/407.2

FOREIGN PATENT DOCUMENTS

| JP | 9-90867 | 4/1997 |
| JP | 2006-79238 | 3/2006 |
| JP | 2008-130055 | 6/2008 |
| JP | 2011-501296 | 1/2011 |

(Continued)

OTHER PUBLICATIONS

International Search Report issued Mar. 19, 2013 in corresponding International Application No. PCT/JP2013/000144.

*Primary Examiner* — Latanya Bibbins
(74) *Attorney, Agent, or Firm* — Wenderoth, Lind & Ponack, L.L.P.

(57) ABSTRACT

A haptic feedback device which provides haptic feedback to a user touching a panel, the haptic feedback device including: the panel; a position obtaining unit which obtains a position touched on the panel by the user; a carrier signal generation unit which generates a carrier signal having a first frequency component when the position touched by the user is a first position, and generates a carrier signal having a second frequency component when the position touched by the user is a second position; an acoustic signal generation unit which generates an acoustic signal having harmonics corresponding to a predetermined fundamental frequency; a driving signal generation unit which generates a driving signal by adding together the carrier signal and the acoustic signal; and an actuator which provides haptic feedback to the user by vibrating the panel in accordance with the driving signal.

9 Claims, 20 Drawing Sheets

(51) Int. Cl.
*G06F 3/0488* (2013.01)
*G06F 3/044* (2006.01)
*B06B 1/02* (2006.01)
*G10K 15/02* (2006.01)
*G06F 3/041* (2006.01)

(56) References Cited

FOREIGN PATENT DOCUMENTS

| | | |
|---|---|---|
| JP | 2011-146006 | 7/2011 |
| WO | 2009/051976 | 4/2009 |

* cited by examiner

FIG. 6

| Top-left position | Bottom-right position | Frequency |
|---|---|---|
| (0, 0) | (100, 1000) | 210 Hz |
| (100, 0) | (200, 1000) | 350 Hz |
| (200, 0) | (300, 1000) | 210 Hz |
| (300, 0) | (400, 1000) | 350 Hz |
| ....... | ....... | ....... |

FIG. 7

| Top-left position | Bottom-right position | Frequency | Phase |
|---|---|---|---|
| (0, 0) | (100, 1000) | 210Hz | In-phase |
| (100, 0) | (200, 1000) | 350Hz | Reverse phase |
| (200, 0) | (300, 1000) | 210Hz | In-phase |
| (300, 0) | (400, 1000) | 350Hz | Reverse phase |
| ....... | ....... | ....... | ....... |

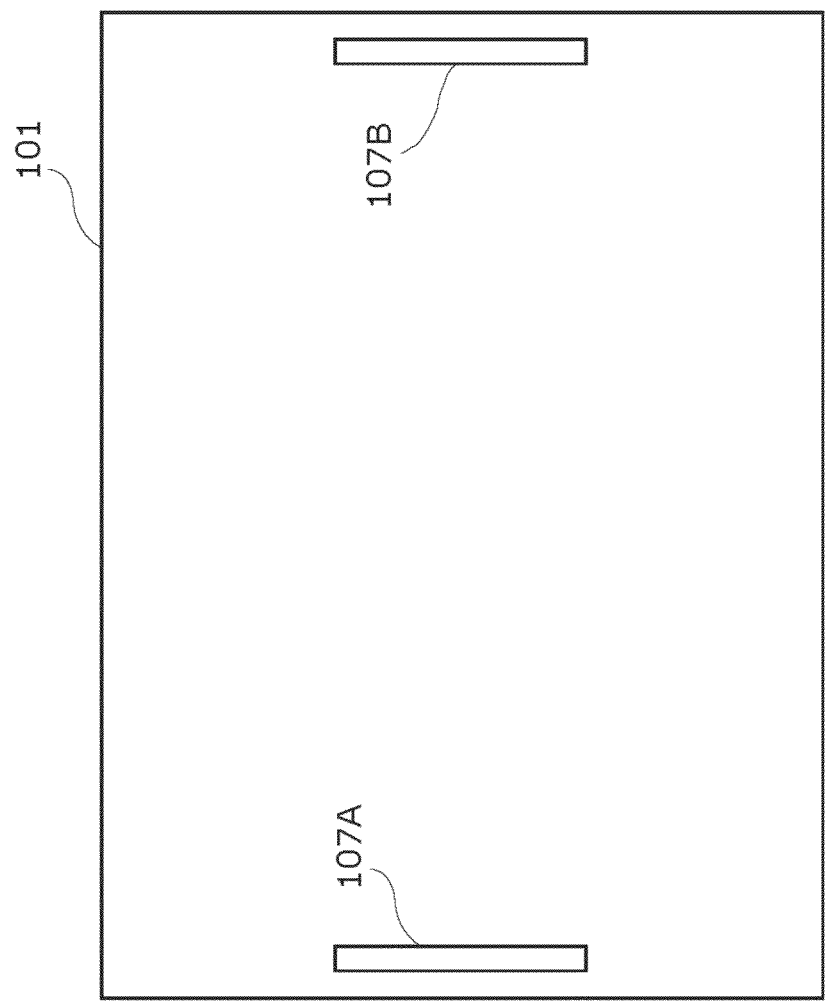

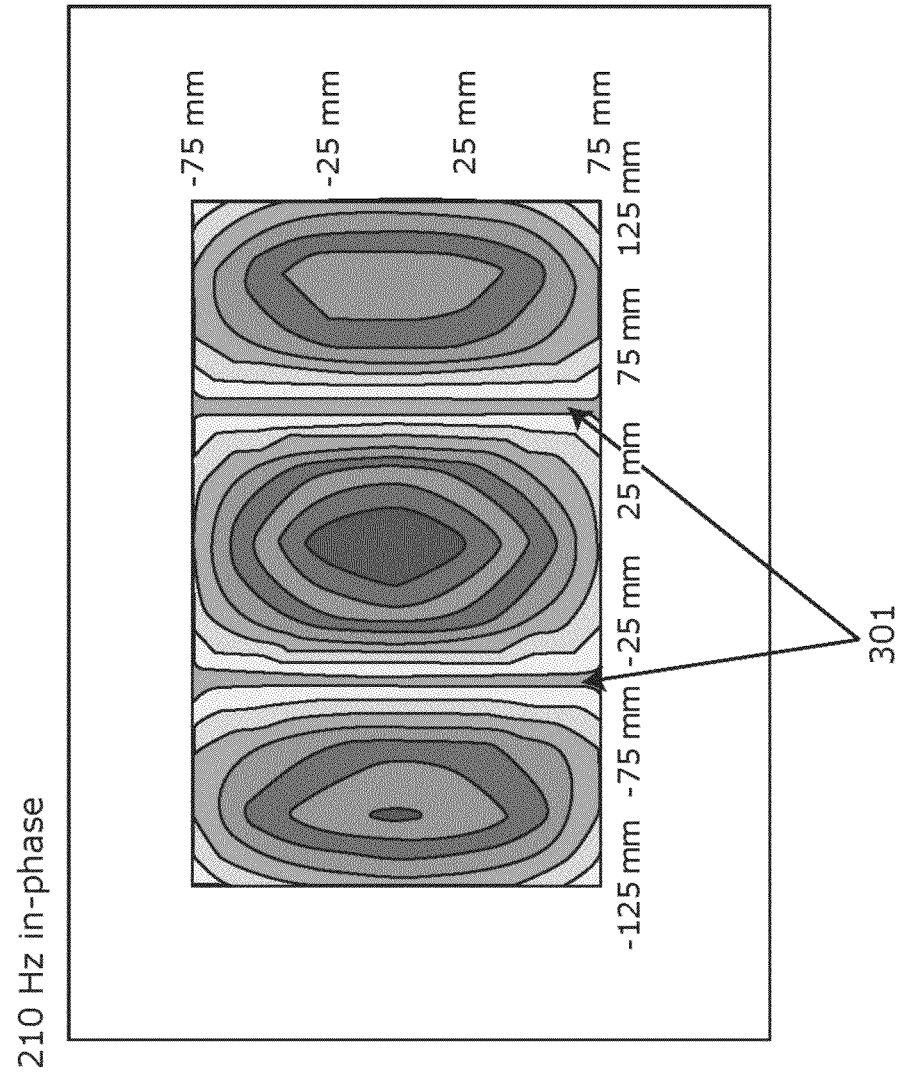

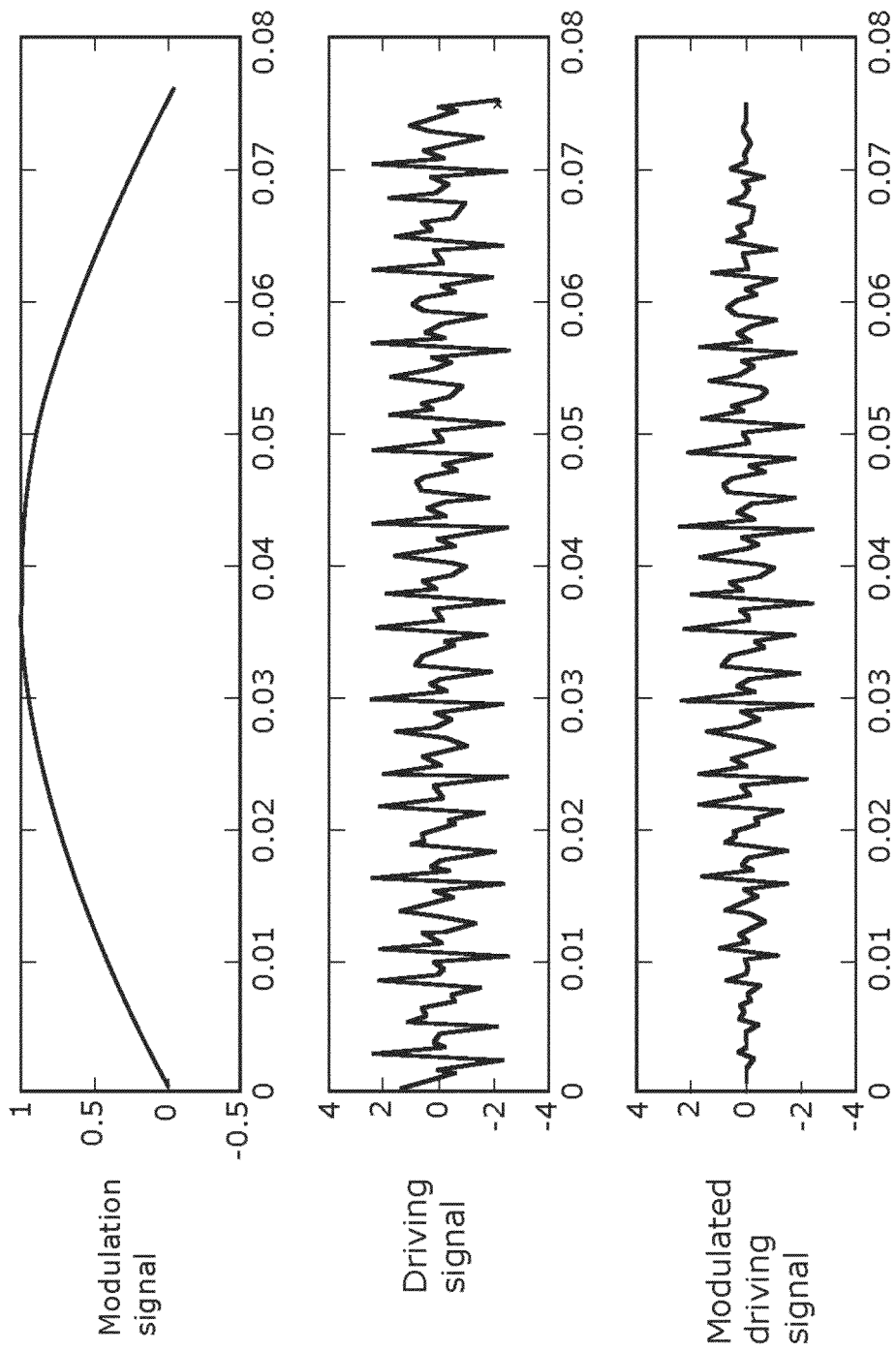

HAPTIC FEEDBACK DEVICE AND HAPTIC FEEDBACK METHOD

TECHNICAL FIELD

The present invention relates to haptic feedback devices which provide haptic feedback to a user touching a panel.

BACKGROUND ART

Recent years have seen the development of devices which operate a mechanism included in a panel based upon a user touching the panel. The panel disclosed in Patent Literature 1 (PTL 1) provides haptic feedback to a user's fingertip by vibrating the panel when the user touches the panel.

CITATION LIST

Patent Literature

[PTL 1] Japanese Unexamined Patent Application Publication No. 2008-130055
[PTL 2] Japanese Unexamined Patent Application Publication (Translation of PCT Application) No. 2011-501296

SUMMARY OF INVENTION

Technical Problem

However, there are instances when acoustic noise is generated as a result of the panel vibrating to provide haptic feedback. This acoustic noise is discomforting or unpleasant to the user.

The present invention provides a haptic feedback device capable of reducing user discomfort caused by acoustic noise produced when the panel vibrates to provide haptic feedback to the user.

Solution to Problem

The haptic feedback device according to an aspect of the present invention is a haptic feedback device which provides haptic feedback to a user touching a panel, the haptic feedback device including: the panel; a position obtaining unit configured to obtain a position touched on the panel by the user; a carrier signal generation unit configured to generate a carrier signal having a first frequency component when the position touched by the user is a first position, and generate a carrier signal having a second frequency component when the position touched by the user is a second position; an acoustic signal generation unit configured to generate an acoustic signal having a plurality of harmonics which correspond to a predetermined fundamental frequency; a driving signal generation unit configured to generate a driving signal by adding together the carrier signal and the acoustic signal; and an actuator which provides haptic feedback to the user by vibrating the panel in accordance with the driving signal.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

User discomfort caused by acoustic noise produced when a panel vibrates to provide haptic feedback to a user can be reduced with the haptic feedback device according to an aspect of the present invention.

BRIEF DESCRIPTION OF DRAWINGS

FIG. 6 is an example of information that the storage unit stores according to the first embodiment.
FIG. 7 is an example of other information that the storage unit stores according to the first embodiment.
FIG. 8 shows an example of the arrangement of the panel and the actuator according to the first embodiment.
FIG. 9A shows an example of the vibration distribution of the panel when the frequency is 210 Hz.
FIG. 19B shows an example of the modulation signal, the driving signal, and the modulated driving signal according to the second embodiment.

DESCRIPTION OF EMBODIMENTS

Underlying Knowledge Forming Basis of the Present Invention

The inventors provide novel insight into user discomfort caused by acoustic noise produced when a panel vibrates to provide haptic feedback to a user. This novel insight is described below.

When a panel vibrates to provide haptic feedback, sound audible to the user is produced (hereinafter referred to as acoustic noise) in accordance with the frequency of the vibrating panel. There is concern that this acoustic noise will cause discomfort or be unpleasant to the user. In light of this, a technique is proposed which audibly suppresses acoustic noise by appending a different frequency component to the vibration frequency component of the panel (for example, PTL 1).

Next, acoustic noise will be explained using the Drawings.

Figure 1A:
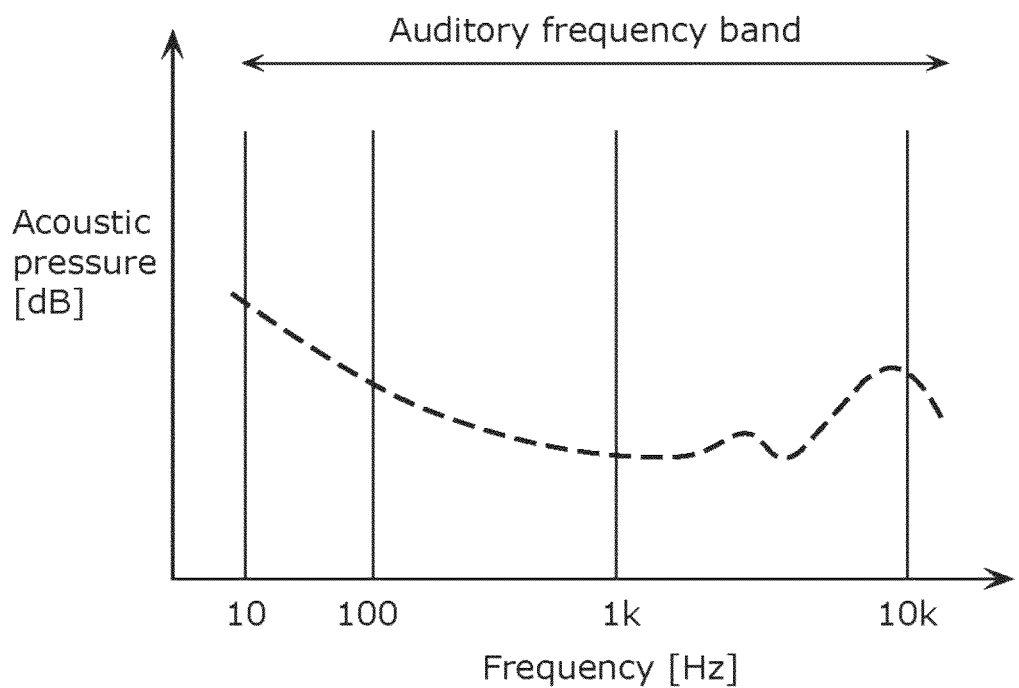
FIG. 1A shows frequency characteristics of human auditory sensation.

FIG. 1A shows frequency characteristics of human auditory sensation. In other words, FIG. 1A shows the frequency band (auditory frequency band) of vibrations perceptible by humans as auditory sensations. More specifically, FIG. 1A shows the minimum audible field of human auditory sensation. As FIG. 1A shows, humans are capable of perceiving vibrations from approximately 20 Hz to 20 kHz as auditory sensations.

Figure 1B:
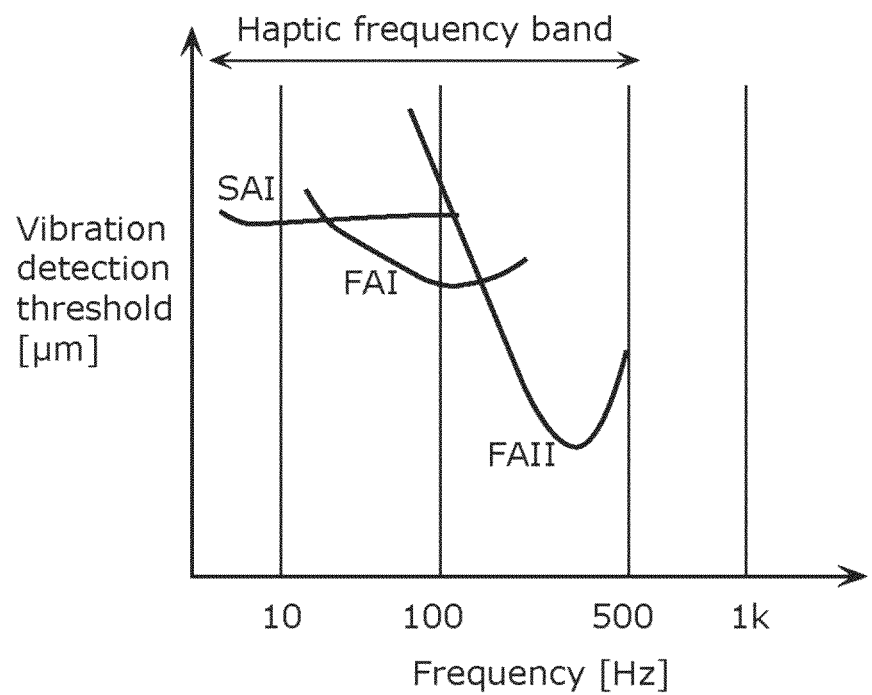
FIG. 1B shows frequency characteristics of human haptic sensation.

On the other hand, FIG. 1B shows frequency characteristics of human haptic sensation. In other words, FIG. 1B shows the frequency band (haptic frequency band) of vibrations perceptible by humans as haptic sensations. More specifically, FIG. 1B shows the frequency characteristics of vibration detection thresholds for the three tactile receptors in humans (SAI, FAI, and FAII). FIG. 1B shows that sensitivity increases as the threshold decreases. As FIG. 1B shows, the tactile receptors are capable of detecting vibrations from a few Hz to 500 Hz, approximately.

As such, the frequency band of vibrations perceptible as auditory sensations (20 Hz to 20 kHz) and the frequency band of vibrations perceptible as haptic sensations (a few Hz to 500 Hz) by humans overlap in a frequency band of approximately 20 Hz to 500 Hz. In other words, vibrating the panel in the frequency band perceptible as haptic sensation generates acoustic noise perceptible as auditory sensation.

Additionally, a technique to effectively vibrate a panel is proposed which varies the vibration frequency of the panel depending on the position touched on the panel by a user (touch position) (for example, PTL 2). With the panel disclosed in PTL 2, the vibration frequency of the panel varies depending on touch position. As such, acoustic noise generated from the panel also varies depending on touch position.

Figure 2:
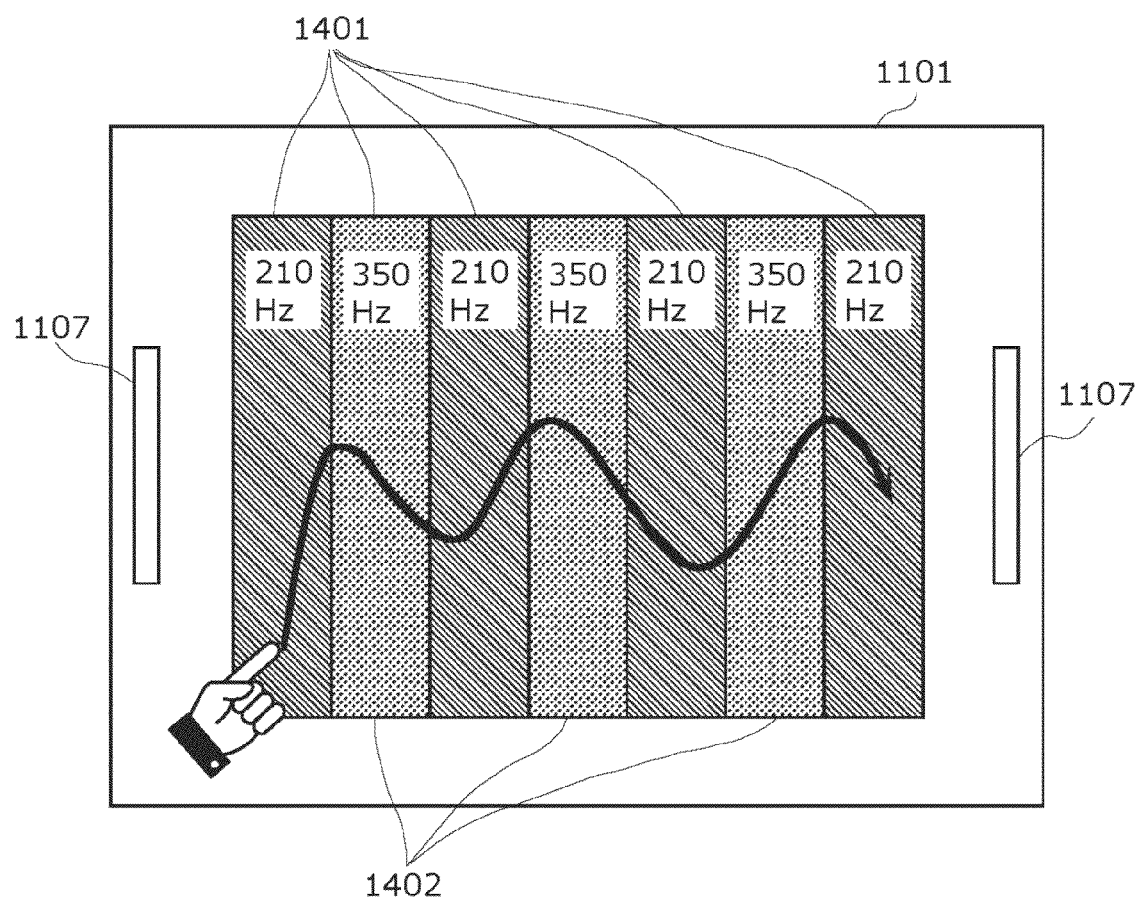
FIG. 2 shows the relation between touch position and vibration frequency.

FIG. 2 shows the relation between touch position and vibration frequency. In FIG. 2, when the touch position is located in the region 1401, the actuator 1107 imparts a vibration of 210 Hz to the panel 1101. In other words, when the touch position is located in the region 1401, acoustic noise of 210 Hz is generated.

On the other hand, when the touch position is located in the region 1402, the actuator 1107 imparts a vibration of 350 Hz to the panel 1101. In other words, when the touch position is located in the region 1402, acoustic noise of 350 Hz is generated.

In other words, when a user traces his or her finger on the panel 1101, acoustic noise changes each time the region including the touch position changes, as FIG. 2 shows.

Figure 3:
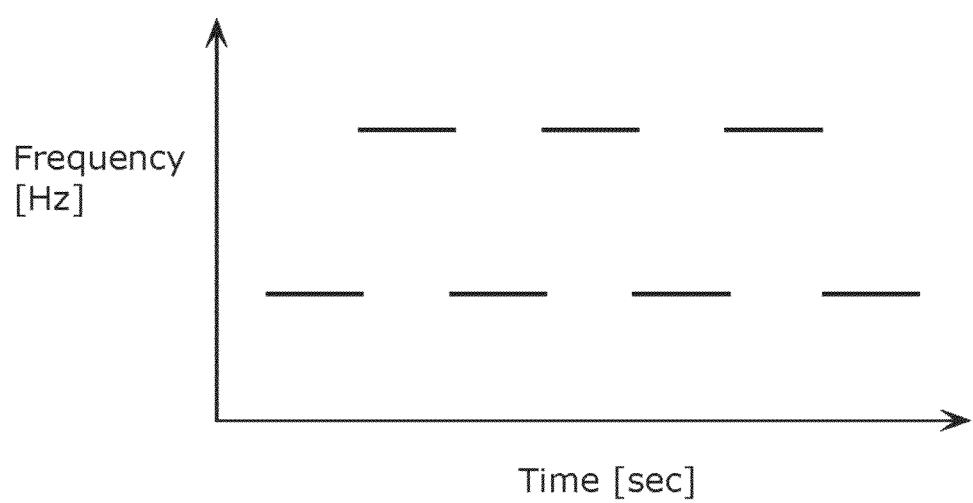
FIG. 3 shows the variation in acoustic noise frequency when the touch position changes.

FIG. 3 shows the variation in acoustic noise frequency when the touch position changes. As FIG. 3 shows, the variation in acoustic noise according to touch position is discontinuous. This sort of variation in acoustic noise is acutely perceptible as an acoustic sensation, causing discomfort to the user. Reduction of this sort of variation in acoustic noise is difficult with the technique disclosed in PTL 1.

For this reason, an aspect of the present invention provides a haptic feedback device capable of reducing discomfort felt by the user from acoustic noise when the vibration frequency of the panel for providing haptic feedback is changed based on touch position on the panel, by reducing variations in acoustic noise caused by the changes in touch position.

The haptic feedback device according to an aspect of the present invention is a haptic feedback device which provides haptic feedback to a user touching a panel, the haptic feedback device including: the panel; a position obtaining unit configured to obtain a position touched on the panel by the user; a carrier signal generation unit configured to generate a carrier signal having a first frequency component when the position touched by the user is a first position, and generate a carrier signal having a second frequency component when the position touched by the user is a second position; an acoustic signal generation unit configured to generate an acoustic signal having a plurality of harmonics which correspond to a predetermined fundamental frequency; a driving signal generation unit configured to generate a driving signal by adding together the carrier signal and the acoustic signal; and an actuator which provides haptic feedback to the user by vibrating the panel in accordance with the driving signal.

With this configuration, when the touch position is a first position or when the touch position is a second position, in either case it is possible to generate a driving signal added with an acoustic signal having a plurality of harmonics corresponding to a predetermined fundamental frequency. Even if a fundamental frequency component is not included in a sound, if a harmonic corresponding to the fundamental frequency is included in the sound, the sound of the fundamental frequency is audible to humans (missing F0 phenomenon). As such, even if the touch position changes from the first position to the second position, the sound of the fundamental frequency can be made to be audible to a user, thereby making it possible to reduce the variation in acoustic noise from the change in touch position. As a result, it is possible to reduce discomfort felt by the user from acoustic noise.

For example, the fundamental frequency may be equal to either the first frequency or the second frequency.

With this, it is possible to use one of the first frequency and the second frequency as the fundamental frequency. As such, it is possible to reduce the types of sounds audible by the user to two types—the sound of the fundamental frequency and the sound of the other of the first frequency and the second frequency plus the fundamental frequency—as well as reduce discomfort felt by the user.

For example, the first frequency may be one of a plurality of resonance frequencies of the panel, and the second frequency may be a different one of the plurality of resonance frequencies of the panel.

With this, it is possible to use the resonance frequencies of the panel as the first frequency and the second frequency. As such, it is possible to effectively vibrate the panel with less energy.

For example, the fundamental frequency may be a frequency at which the panel resonates strongest among the plurality of resonance frequencies.

With this, it is possible to use the frequency at which the panel resonates the strongest as the fundamental frequency. Generally, the greater the amplitude of the panel is, the louder the sound perceived by the user is. As such, when a vibration of the frequency at which the panel resonates the strongest is imparted to the panel followed by a vibration of a different resonance frequency, it is possible to cause the user to continuously hear the loudest perceived sound. As a result, it is possible to further reduce the variation in acoustic noise and reduce discomfort felt by the user.

For example, the plurality of harmonics may be harmonics at frequencies higher than a maximum frequency predetermined as an upper limit for frequencies of vibrations to be haptically perceived by the user.

With this configuration, it is possible to use harmonics at frequencies higher than the maximum frequency, as the plurality of harmonics included in the acoustic signal. As such, it is possible to suppress variation in haptic feedback in order to reduce variation in acoustic noise.

For example, the actuator may include a first actuator and a second actuator placed in different positions, the carrier signal generation unit may be configured to: when the position touched is the first position, generate a carrier signal for the first actuator and a carrier signal for the second actuator having a phase relation corresponding to the first position; and when the position touched is the second position, generate a carrier signal for the first actuator and a carrier signal for the second actuator having a phase relation corresponding to the second position, and the driving signal generation unit may be configured to generate a driving signal for the first actuator by adding together the carrier signal for the first actuator and the acoustic signal, and generate a driving signal for the second actuator by adding together the carrier signal for the second actuator and the acoustic signal.

With this configuration, it is possible to use a phase relation dependent on the touch position when generating the carrier signal for the plurality of actuators. As such, it is possible to increase carrier signal variations and effectively vibrate the panel.

For example, the acoustic signal generation unit may be configured to generate the acoustic signal having the plurality of harmonics whose signal strengths decrease with increasing frequency.

With this, it is possible to generate an acoustic signal having a plurality of harmonics whose signal strengths weaken with increasing frequency. As such, it is possible to relatively reduce the strength of the high frequency component at which vibration of the panel requires great strength, and reduce the energy required to reduce variation in acoustic noise.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Moreover, in each of the embodiments described below, the same reference numerals are used for the same or similar structural elements, and as such, explanations thereof are omitted.

First Embodiment

Figure 4:
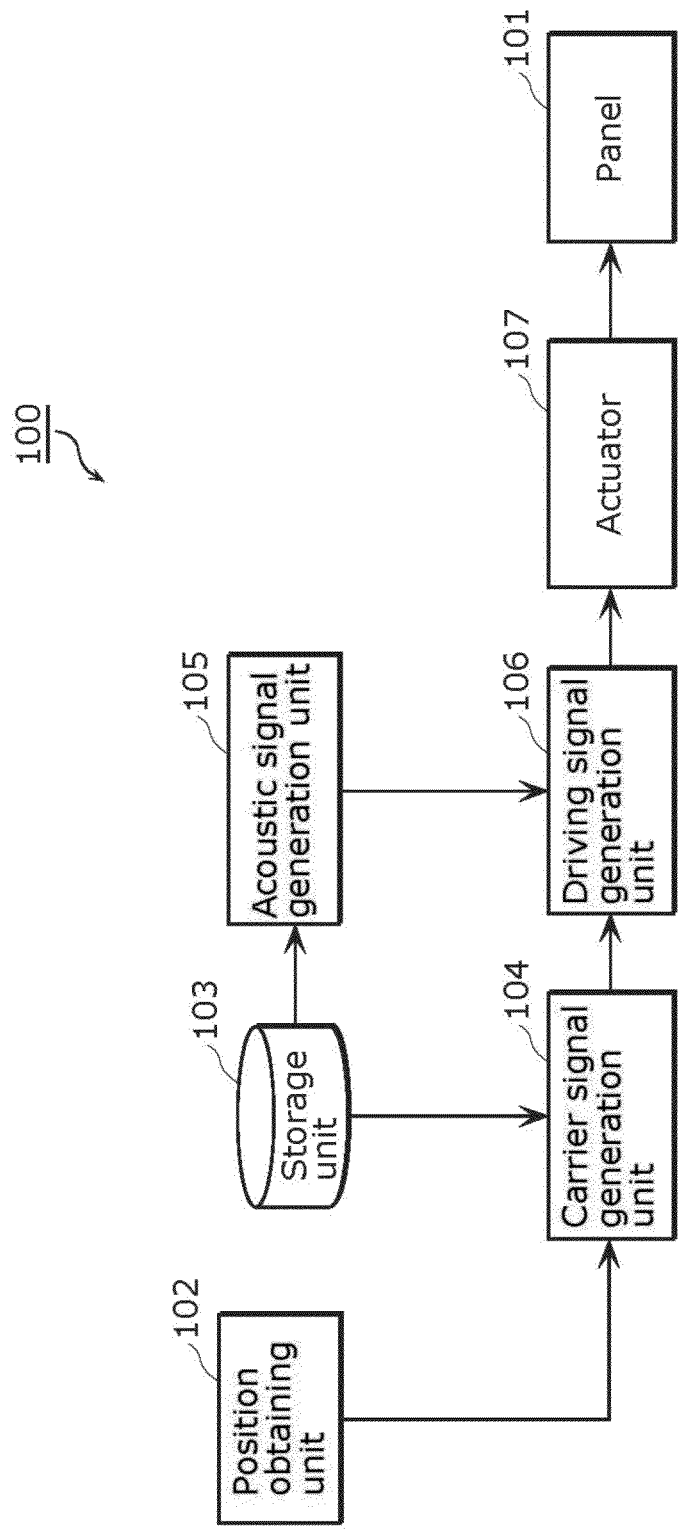
FIG. 4 is a block diagram of a haptic feedback device according to the first embodiment.

FIG. 4 is a block diagram of the haptic feedback device 100 according to the first embodiment. The haptic feedback device 100 provides haptic feedback to a user touching a panel.

As FIG. 4 shows, the haptic feedback device 100 includes a panel 101, a position obtaining unit 102, a storage unit 103, a carrier signal generation unit 104, an acoustic signal generation unit 105, a driving signal generation unit 106, and an actuator 107.

(Panel 101)

The panel 101 conveys vibrations for providing haptic feedback to a user. More specifically, the panel 101 is, for example, glass or acrylic.

The panel 101 is a screen which displays content, for example. It should be noted that content refers to images of, for example, animals, clothes, or games, or videos such as movies or music videos. Additionally, content may be a row of buttons such as a software-based keyboard.

It should be noted that the material, shape, size, thickness, hardness, and fixing method of the panel 101 are not limited to any particular example.

(Position Obtaining Unit 102)

When the user touches the panel 101, the position obtaining unit 102 obtains the position of the touch on the panel 101 (touch position). The touch position is equivalent to one or a plurality of pixels of the panel 101.

Figure 5:
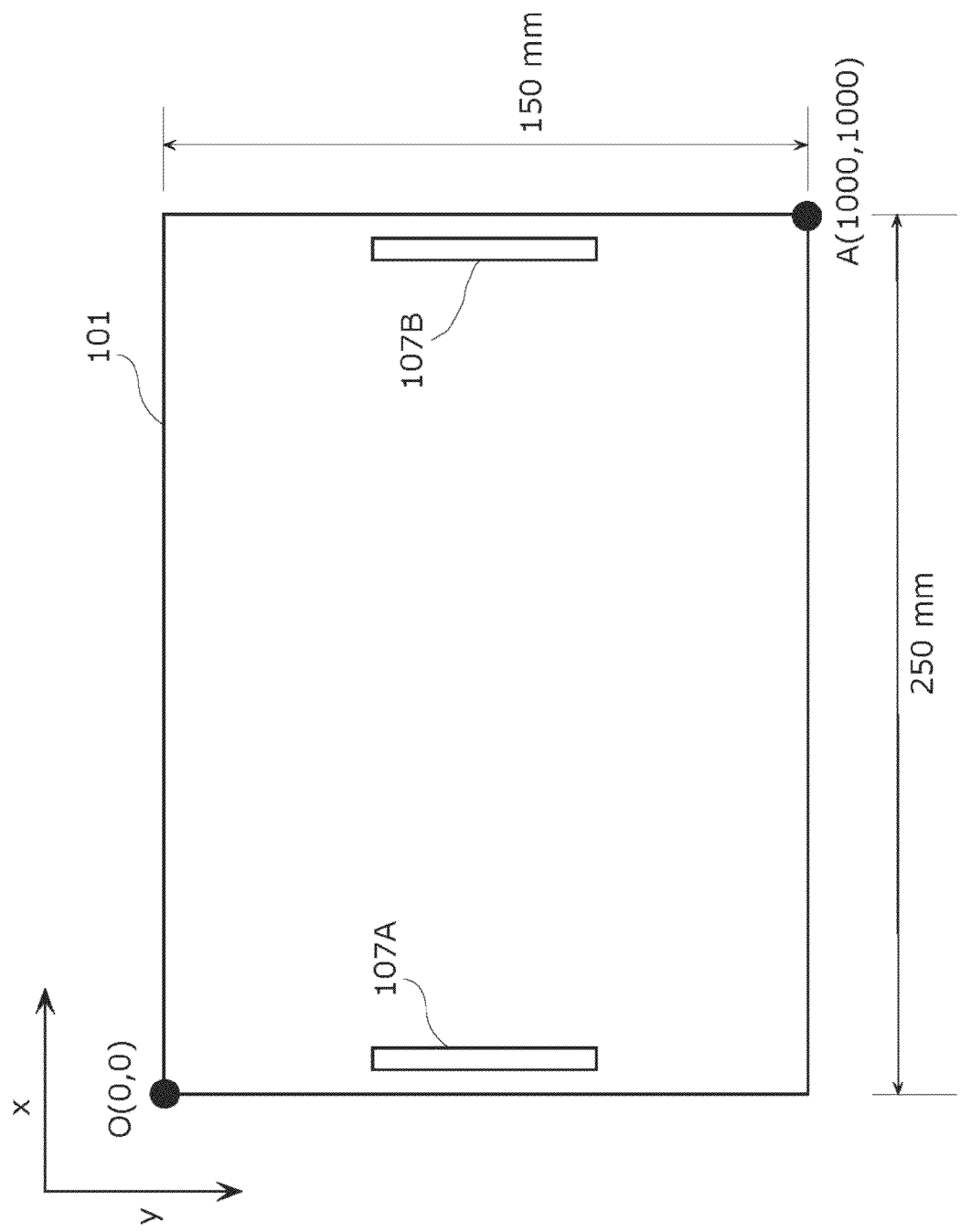
FIG. 5 shows an example of an X-Y coordinate system for representing the touch position.

It should be noted that position on the panel 101 may be expressed in an X-Y coordinate system. FIG. 5 shows an example of an X-Y coordinate system for representing the touch position. In FIG. 5, the horizontal direction (direction parallel to the lengthwise direction) of the approximately 12 inch (150 mm (H)×250 mm (L)) rectangular panel 101 is set as the X axis, and the vertical direction (direction parallel to the heightwise direction) is set as the Y axis. Moreover, the top-left corner of the panel 101 is set as the origin 0 (0, 0). Additionally, the X and Y axes are in increments of 0.25 mm, 0.15 mm, and 0.25 mm. In other words, the coordinates for point A in the bottom right corner of the panel 101 are (1000, 1000).

The position obtaining unit 102 obtains a touch position by, for example, electrostatic capacitive method or resistive method. It should be noted that the method of obtaining the touch position is not necessarily limited to electrostatic capacitive or resistive methods.

Next, obtainment of the touch position by the position obtaining unit 102 by the electrostatic capacitive method will be discussed. When the user touches the panel 101 with his or her finger or a stylus pen, the position obtaining unit 102 obtains the touch position by detecting a change in the electrostatic capacitance of the panel 101. At this time, as the touch position, the position obtaining unit 102 continuously obtains a center position of a range touched on the panel 101 at predetermined time intervals. It should be noted that the position obtaining unit 102 may obtain the center of gravity of the load as the touch position instead of the center position.

It should be noted that in addition to the touch position, the position obtaining unit 102 may obtain the time at which the panel 101 was touched by the user (touch time). This touch time does not need to include year, month, and date information such as in the example 11:11:11.11, or may include year, month and date information such as in the example 2011/11/11 11:11:11.11. It should be noted that the touch time may be obtained at the same time as the touch position.

(Storage Unit 103)

The storage unit 103 stores a plurality of frequencies corresponding to a plurality of positions on the panel 101.

Each of the plurality of frequencies the storage unit 103 stores may be a resonance frequency of the panel 101. A resonance frequency of the panel 101 is a frequency at which the panel 101 naturally vibrates (natural frequency). When the panel 101 vibrates at a natural frequency thereof, the amplitude increases. The resonance frequency of the panel 101 depends on the material, size, thickness, and hardness of the panel 101.

Each of the plurality of frequencies the storage unit 103 stores may be a frequency perceptible to the user by touch. A frequency perceptible to the user by touch is a frequency in the band perceptible to the user by touch. Generally, the frequency band perceptible by human touch is greater than 0 Hz and less than 500 Hz, as FIG. 1B shows. As such, the frequency band perceptible to the user by touch is for example, within a range of greater than 0 Hz and less than 500 Hz. It should be noted that the frequency band perceptible by touch varies slightly from person to person. As such, the plurality of frequencies may be set individually for each user.

The format that the plurality of frequencies corresponding to the plurality of positions are stored in may be any format which allows the frequencies corresponding to positions on the panel 101 to be identifiable.

Next, a specific example of information which the storage unit 103 stores will be described using the 12 inch panel 101 shown in FIG. 5.

FIG. 6 is an example of information that the storage unit 103 stores according to the first embodiment. In FIG. 6, the storage unit 103 stores pairs of frequencies and rectangular regions defined by coordinates of a bottom-left position and coordinates of a bottom-right position.

In FIG. 6, a touch position (10, 10) is included in the rectangular region defined by the top-left position (0, 0) and the bottom-right position (100, 1000), for example. As such, the touch position (10, 10) has a corresponding frequency of 210 Hz.

It should be noted that the information which the storage unit 103 stores may include phase information in addition to the frequencies. Here, phase information is information indicating the phase relationship between a plurality of carrier signals or the phase relationship between a plurality of driving signals. More specifically, phase information is information indicating, for example, either in-phase, reverse phase, or phase lag. In contrast to changing just frequency, using both phase and frequency allows for the more types of vibration modes for the panel 101. For this reason, the haptic feedback device 100 is capable of even more effectively providing haptic feed back to the user at any position on the panel 101. Here, the vibration mode is the type of vibration of the panel 101 when the panel 101 vibrates.

FIG. 7 is a different example of information that the storage unit 103 stores according to the first embodiment. In FIG. 7, the storage unit 103 stores frequencies and phases (phase information) corresponding to rectangular regions.

In FIG. 7, when a touch position is included in the rectangular region defined by the top-left position (0, 0) and the bottom-right position (100, 1000), the touch position has a corresponding frequency and phase of 210 Hz and in-phase. Moreover, for example, when the touch position is included in the rectangular region defined by the top-left position (100, 0) and the bottom-right position (200, 1000), the touch position has a corresponding frequency and phase of 350 Hz and reverse phase.

It should be noted that the storage unit 103 may configured from, for example, a semiconductor memory, a magnetic disc, or an optical disc. Moreover, the storage unit 103 may be a storage device (for example, network attached storage (NAS) or a memory card) connected to the haptic feedback device 100 via an interface. In this case, the haptic feedback device 100 is not required to be equipped with the storage unit 103.

It should be noted that the storage unit 103 may store frequencies at which the vibration amplitude of the panel 101 exceeds a predetermined threshold amplitude. The predetermined threshold is an amplitude perceptible by touch, and is, for example, approximately a few μm.

Here, in order to provide haptic feedback to a user at any position on the panel 101, the frequency for vibrating the panel 101 must be changed based on the touch position. Hereinafter, reasoning therefore will be discussed using actual measurement results.

Figure 9B:
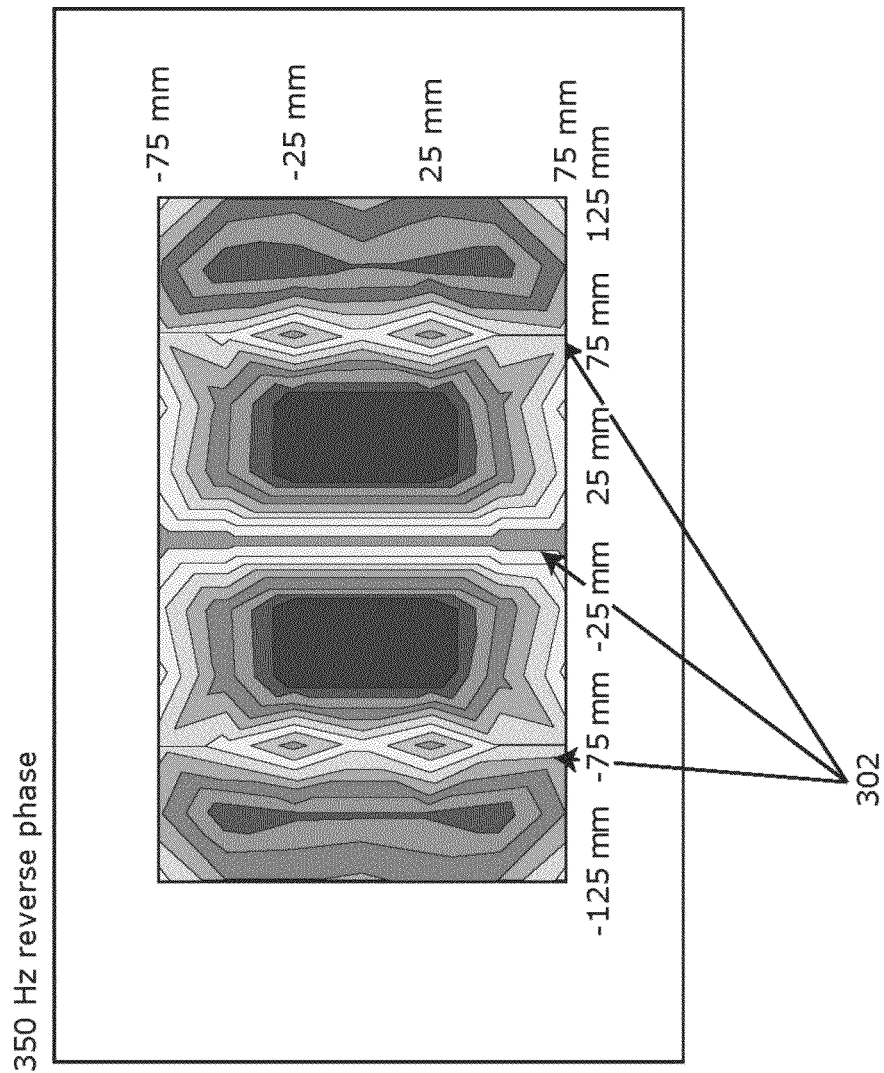
FIG. 9B shows an example of the vibration distribution of the panel when the frequency is 350 Hz.

FIG. 8 shows an example of the arrangement according to the first embodiment of the panel 101 and the actuator 107 (the first actuator 107A and the second actuator 107B). FIG. 9A and FIG. 9B are examples of vibration distributions of the panel 101.

The panel 101 and the actuator 107 (the first actuator 107A and the second actuator 107B) are in contact with each other. The panel 101 vibrates as a result of the actuator 107 being driven. Moreover, the driving frequency of the actuator 107 is a resonance frequency of the panel 101.

FIG. 9A shows an actual measurement result of the vibration distribution of the panel 101 when the driving signal of the first actuator 107A and the driving signal of the second actuator 107B are in-phase and the frequency of each of the driving signals is 210 Hz. In FIG. 9A, the dark regions indicate the regions where the vibration amplitude of the panel 101 is high, and the light regions indicate the regions where the vibration amplitude of the panel 101 is low. In other words, in FIG. 9A, the region 301 is equivalent to the vibration node. As such, when the two driving signals are in-phase, and the frequency of each driving signal is 210 Hz, there is a possibility that haptic feedback cannot be provided in region 301.

On the other hand, FIG. 9B shows an actual measurement result of the vibration distribution of the panel 101 when the driving signal of the first actuator 107A and the driving signal of the second actuator 107B are in reverse phase and the frequency of each of the driving signals is 350 Hz. In FIG. 9B, the region 302 is equivalent to the vibration node. As such, when the two driving signals are in reverse phase, and the frequency of each driving signal is 350 Hz, there is a possibility that haptic feedback cannot be provided in region 302.

As described above, there are positions on the panel 101 at which haptic feedback cannot be provided to the user depending on the frequency and phase of the driving signal of the panel 101. As such, it is necessary to change the frequency of the driving signal depending on the touch position on the panel 101.

Figure 10:
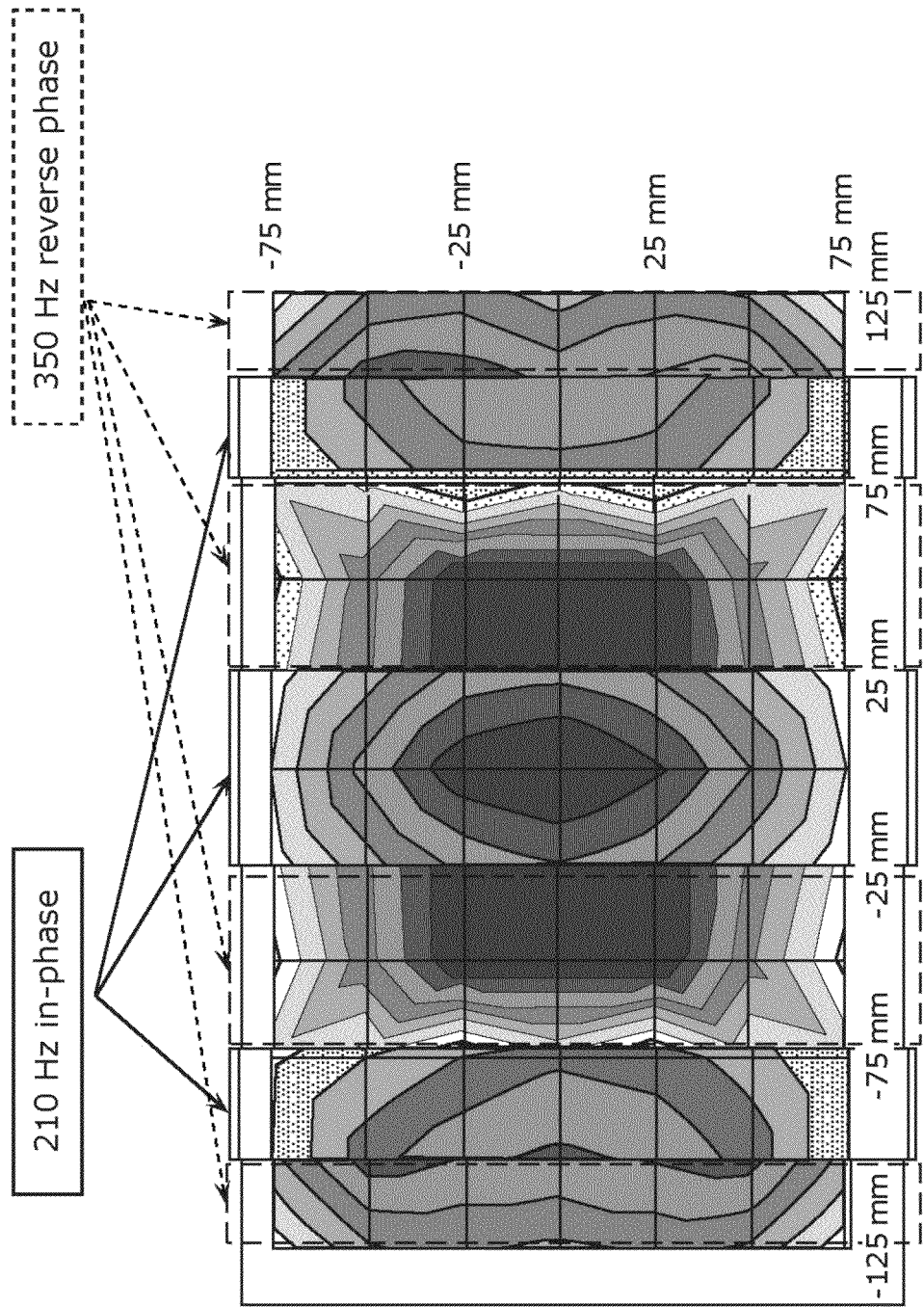
FIG. 10 shows the vibration distribution of the panel when frequency is switched depending on the touch position.

FIG. 10 shows the vibration distribution of the panel when frequency is switched depending on the touch position. As FIG. 10 shows, haptic feedback is provided to a user at any position on the panel 101 by changing the frequency for vibrating the panel 101 based on the position on the panel 101.

It should be noted that the above actual measurement tests used phase information, but phase information is not required to be used. In the case that phase information is not used, it is possible to provide haptic feedback to a user at the majority of positions on the panel 101 by changing the frequency for vibrating the panel 101 based on the touch position.

(Carrier Signal Generation Unit 104)

The carrier signal generation unit 104 refers to information stored in the storage unit 103 and obtains the frequency corresponding to the touch position obtained by the position obtaining unit 102. The carrier signal generation unit 104 then generates a carrier signal having a frequency component at the obtained frequency.

In other words, the carrier signal generation unit 104 generates a carrier signal having a first frequency component when the touch position is a first position, and generates a carrier signal having a second frequency component when the touch position is a second position. Here, the first position and the second position are different positions on the panel 101.

A specific example of the generation method for the carrier signal will be described using the 12 inch panel 101 shown in FIG. 5. First, the carrier signal generation unit 104 determines which region among a plurality of regions includes the touch position. The carrier signal generation unit 104 then generates a carrier signal having a frequency component corresponding to the region in which the touch position is included.

For example, when the touch position is (150, 500), the carrier signal generation unit 104 refers to the information shown in FIG. 6 and determines that the region in which the touch position is included is the region defined by the top-left position (100, 0) and the bottom-right position (200, 1000). The carrier signal generation unit 104 then generates a carrier signal having a frequency component at 350 Hz, which corresponds to the region determined to include the touch position.

It should be noted that the carrier signal generation unit 104 may refer to the information shown in FIG. 7, obtain the phase information corresponding to the touch position, and generate a carrier signal using the obtained phase information. For example, when the touch position is (150, 500), the carrier signal generation unit 104 generates two carrier signals (a carrier signal for the first actuator 107A and a carrier signal for the second actuator 107B) having a reverse phase and a frequency of 350 Hz.

It should be noted that the carrier signal generation unit 104 generates, for example, as the carrier signal, a sine wave having a frequency $F_c$ and a strength (amplitude) of 1, in accordance with Equation 1 below.

[Math 1]

$$s_C(t) = \sin(2\pi F_c t) \quad (1)$$

Here, $s_c$ is the carrier signal, $F_c$ is a frequency corresponding to the touch position from among the plurality of frequencies stored in the storage unit 103, and t is time.

It should be noted that the carrier signal generation unit 104 is not required to generate a carrier signal, and may simply determine a frequency that corresponds to the touch position.

It should be noted that the carrier signal generation unit 104 may be implemented as a CPU, for example.

(Acoustic Signal Generation Unit 105)

The acoustic signal generation unit 105 generates an acoustic signal having a plurality of harmonics which correspond to a predetermined fundamental frequency.

In the first embodiment, the acoustic signal generation unit 105 generates an acoustic signal having a plurality of harmonics which correspond to at least one predetermined frequency (fundamental frequency) from among a plurality of frequencies stored in the storage unit 103. In other words, the fundamental frequency is at least one of a plurality of frequencies stored in the storage unit 103.

It should be noted that the acoustic signal generation unit 105 generates an acoustic signal having a plurality of harmonics which correspond to the same fundamental frequency regardless of touch position. In other words, the acoustic signal generation unit 105 generates the same acoustic signal when the touch position is the first position and when the touch position is the second position.

Here, a harmonic refers to a high-order frequency component that is an integer multiple of the fundamental frequency. For example, when the fundamental frequency is 350 Hz, the harmonics are frequency components at 700 Hz, 1050 Hz, 1400 Hz, and so on.

The acoustic signal has a plurality of harmonics. As such, the acoustic signal has at least two frequency components excluding the fundamental frequency which are high-order frequency components that are integer multiples of the fundamental frequency. For example, the acoustic signal has a frequency component that is two times the fundamental frequency (second harmonic), a frequency component that is three times the fundamental frequency (third harmonic), and a frequency component that is n time the fundamental frequency (n-th harmonic), where n is an integer no less than four. It should be noted that the more variations (frequencies) of harmonics there are in the sound to be perceived by the user, the more the sound of the fundamental frequency corresponding to those harmonics will be felt by the user.

Next, the reasoning for the acoustic signal generation unit 105 generating an acoustic signal having a plurality of harmonics which correspond to the same fundamental frequency regardless of touch position will be described.

When a person hears a sound having a plurality of harmonics corresponding to a single fundamental frequency, even if the fundamental frequency component (fundamental wave) is not included in the sound, the pitch (fundamental frequency) of the sound is perceived, as an auditory sensation, no differently than a sound which includes the fundamental frequency component. This phenomenon is known as "missing F0". Using this phenomenon, it is possible to reduce discomfort felt by the user originating in the discontinuous acoustic noise.

As previously described, in the first embodiment, in order to provide haptic feedback to the user, the frequency of the carrier signal is changed based on the touch position. Then, using the carrier signal, a driving signal for the actuator 107 is generated. As such, when the user performs an action which changes the touch position (for example, tracing his or her finger across the panel 101), there are cases when the vibration frequency of the panel 101 changes in the middle of the action performed. As such, the acoustic noise also changes discontinuously when the vibration frequency of the panel 101 changes.

For example, when the frequency corresponding to the first position (first frequency) and the frequency corresponding to the second position (second frequency) are different, the acoustic noise generated when the touch position is the first position and the acoustic noise generated when the touch position is the second position are different. As such, when the user performs an action which causes the touch position to move from the first position to the second position, the acoustic noise changes discontinuously.

For this reason, the acoustic signal generation unit 105 uses either the first frequency corresponding to the first position or the second frequency corresponding to the second position as the fundamental frequency. In other words, in both the event that the touch position is the first position and the event that the touch position is the second position, the haptic feedback device 100 generates a sound having a plurality of harmonics corresponding to the same fundamental frequency. Due to the missing F0 phenomenon, this causes the user to feel like he or she is hearing a sound which includes the fundamental frequency component even if the sound does not actually include the fundamental frequency component. As such, the user feels like he or she is hearing the same acoustic noise regardless of whether the touch position is the first position or the second position. Consequently, the discontinuous change in acoustic noise is reduced, and discomfort felt by the user due to this discontinuous change in acoustic noise is reduced.

It should be noted that when the touch position is a third position, the acoustic signal generation unit 105 generates an acoustic signal having a plurality of harmonics which correspond to the same fundamental frequency as when the touch position is the first position and when the touch position is the second position. With this, in the event that the user performs an action in which the touch position changes, in order, from the first position to the second position followed by the third position as well, discontinuous change in acoustic noise is reduced.

Next, the reasoning for the acoustic signal generation unit 105 generating an acoustic signal having a plurality of harmonics which correspond to the same fundamental frequency regardless of touch position will be described in further detail using a specific example. For example, assume that the plurality of frequencies stored in the storage unit 103 are 210 Hz and 350 Hz. Moreover, assume that the first frequency corresponding to the first position is 210 Hz, and the second frequency corresponding to the second position is 350 Hz.

In this case, if the acoustic signal is not generated, the acoustic noise at 210 Hz when the touch position is the first position and the acoustic noise at 350 Hz when the touch position is the second position are audible to the user. As such, when the user performs an action which causes the touch position to move from the first position to the second position, the acoustic noise discontinuously changes from 210 Hz to 350 Hz mid-change.

For this reason, the acoustic signal generation unit 105 generates an acoustic signal having a plurality of harmonics corresponding to at least one 210 Hz or 350 Hz (for example, 350 Hz), which are the plurality of frequencies stored in the storage unit 103. In other words, the acoustic signal generation unit 105 generates an acoustic signal having a 700 Hz component (second harmonic), a 1050 Hz component (third harmonic), and a 350×n Hz component (n-th harmonic), which are frequency components that are multiples of 350 Hz.

In other words, in both the event that the touch position is the first position and the event that the touch position is the second position, the acoustic signal generation unit 105 generates an acoustic signal having a plurality of harmonics that correspond to the fundamental frequency 350 Hz. In other words, in both the event that the touch position is the first position and the event that the touch position is the second position, the acoustic signal generation unit 105 generates a sound having the same plurality of harmonics. As such, due to the missing F0 phenomenon, when the touch position is the first position, the user to feel like he or she is hearing a sound which includes the acoustic noise at the fundamental frequency of 350 Hz, regardless of whether the vibration frequency of the panel does or does not include the fundamental frequency component of 350 Hz. It should be noted that when the touch position is the second position, since the vibration frequency of the panel includes the fundamental frequency component of 350 Hz, the user can hear the acoustic noise of 350 Hz even when the acoustic signal is not generated.

As described above, in both the event that the touch position is the first position and the event that the touch position is the second position, the user can hear the acoustic noise of 350 Hz, and as such, the discontinuous change in acoustic noise involved in the change in vibration frequency of the panel 101 is reduced. Consequently, discomfort felt by the user due to this discontinuous change in acoustic noise is reduced.

It should be noted that the plurality of harmonics included in the acoustic signal may be harmonics at frequencies higher than a maximum frequency predetermined as an upper limit for frequencies of vibrations to be haptically perceived by the user. This makes it possible to reduce the change in acoustic noise without effecting haptic perception. The predetermined maximum frequency is, for example, 500 Hz, as FIG. 1B shows. It should be noted that the maximum frequency is not required to be 500 Hz, and may be changed according to the portion of the body the user uses for touching (for example a finger tip or the palm of a hand).

Moreover, the fundamental frequency corresponding to the plurality of harmonics included in the acoustic signal may be a frequency at which the panel 101 resonates the strongest among the plurality of resonance frequencies of the panel 101. Here, the frequency at which the panel 101 resonates the strongest is a frequency when the amplitude of the vibration of the panel 101 is the greatest. Acoustic pressure increases with increasing amplitude. This means the larger the amplitude, the louder sound is audibly. Thus, as a result of the acoustic signal generation unit 105 generating an acoustic signal having a plurality of harmonics corresponding to a frequency (the fundamental frequency) at which the panel 101 resonates the strongest, the user feels like he or she can hear the fundamental frequency better.

It should be noted that the acoustic signal generation unit 105 may be implemented as a CPU, for example.

Here, the strength of the resonance is calculated using the value Q shown in Equation 2.

[Math 2]

$$Q = \frac{\omega_0}{\omega_2 - \omega_1} \quad (2)$$

Figure 11:
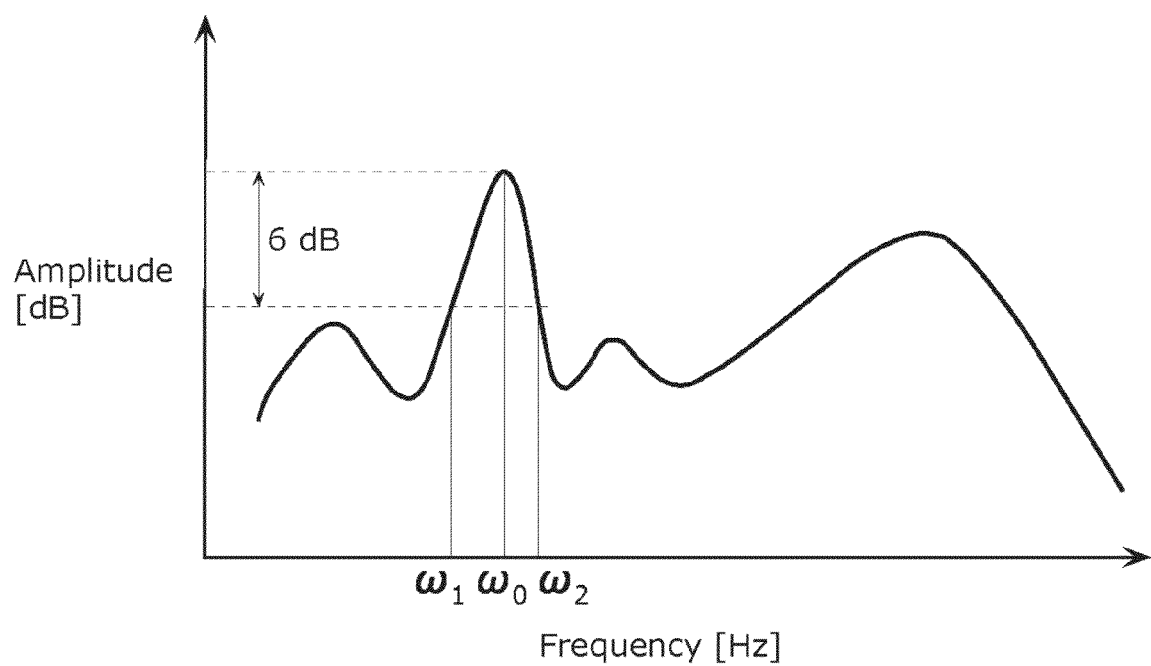
FIG. 11 shows characteristics of frequency and amplitude.

In Equation 2, $\omega_o$ is resonance frequency. $\omega_1$ is a frequency at which the vibration energy at the left side of the resonance frequency becomes half that of the resonance frequency. Moreover, $\omega_2$ is a frequency at which the vibration energy at the right side of the resonance frequency becomes half that of the resonance frequency (see FIG. 11).

It should be noted that the acoustic signal generation unit 105 generates the acoustic signal $s_A$ in accordance with Equation 3 below, for example. In this case, the acoustic signal is a signal having n number of sine waves having a strength of 1 and a frequency of $kF_b$ (where k is an integer between 2 and n).

[Math 3]

$$s_A(t) = \sum_{k=2}^{n} \sin(2\pi k F_b t) \quad (3)$$

Here, $s_A$ is the acoustic signal, K is an integer no less than 2 and no more than n, n is an integer greater than or equal to 2, $F_b$ is one frequency (the fundamental frequency) among the plurality of frequencies stored in the storage unit 103, and t is time.

It should be noted that the acoustic signal generation unit 105 is not required to generate an acoustic signal, and may simply determine frequencies for the plurality of harmonics.

It should be noted that the preceding description was based on there being one fundamental frequency, but a plurality of fundamental frequencies may be used. Moreover, all frequencies stored in the storage unit 103 may be used as the fundamental frequencies. In this case, the acoustic signal generation unit 105 generates an acoustic signal having all of the plurality of harmonics which correspond to the plurality of frequencies stored in the storage unit 103. This allows the user to hear acoustic noise dependent on all frequencies stored in the storage unit 103 regardless of the touch position on the panel 101. As such, the discontinuous change in acoustic noise involved in the change in vibration frequency of the panel 101 is reduced.

Next, an example of the determination method of the fundamental frequency used in the generation of the acoustic signal will be described.

For example, when the acoustic signal generation unit 105 determines only one fundamental frequency from the plurality of frequencies, the acoustic signal generation unit 105 may determine, as the fundamental frequency, from among the plurality of harmonics corresponding to the plurality of frequencies, a frequency corresponding to a harmonic that is (i) at a frequency higher than the maximum frequency of the vibrations to be haptically perceived and (ii) at a lowest frequency. An example of the determination method of the fundamental frequency will be described using FIG. 12.

Figure 12:
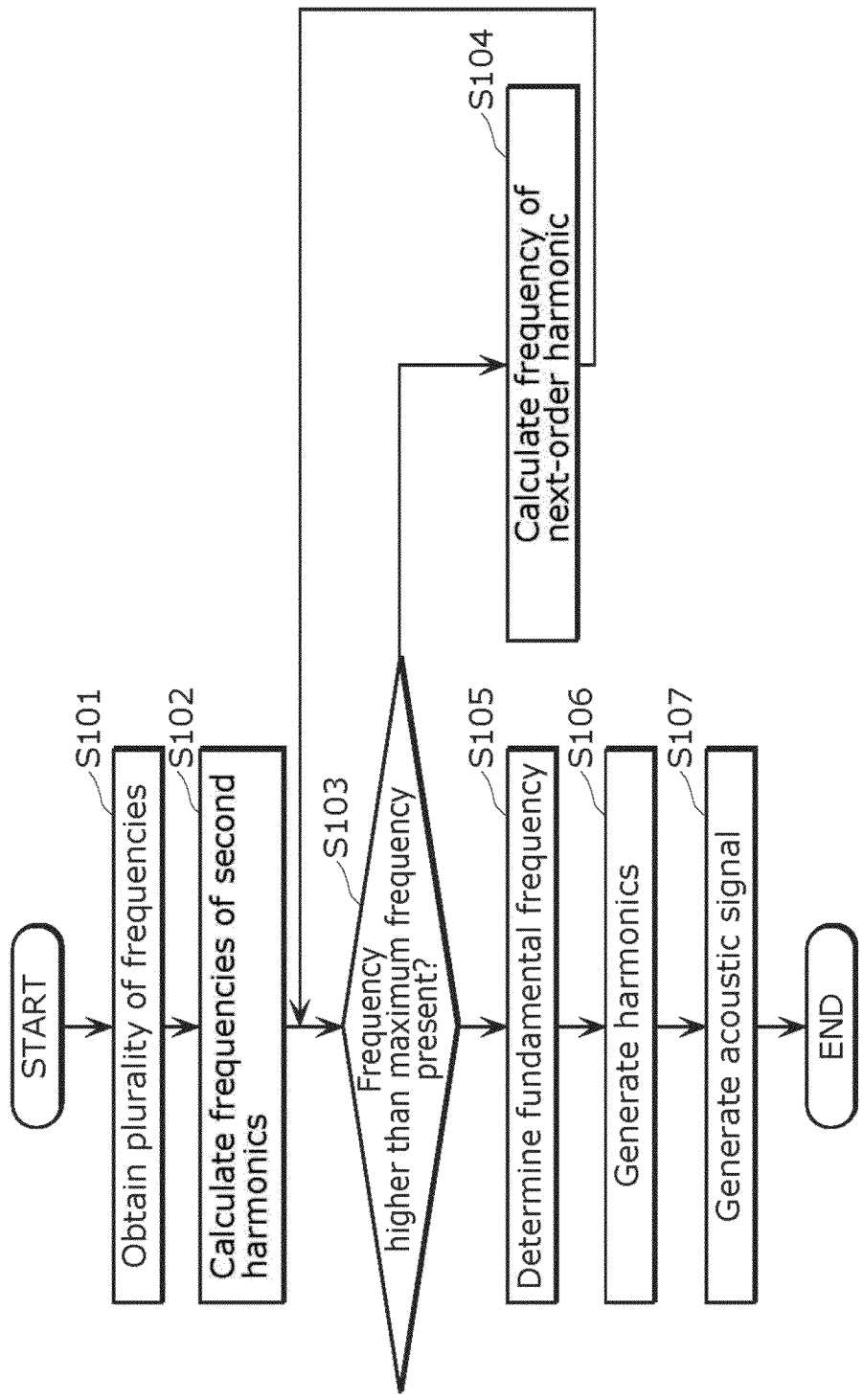
FIG. 12 is a flow chart showing processes performed by the acoustic signal generation unit according to the first embodiment.

FIG. 12 is a flow chart showing processes performed by the acoustic signal generation unit 105 according to the first embodiment.

(Step S101)

The acoustic signal generation unit 105 obtains a plurality of frequencies stored in the storage unit 103.

For example, when the frequencies stored in the storage unit 103 are 210 Hz and 350 Hz, the acoustic signal generation unit 105 obtains 210 Hz and 350 Hz.

(Step S102)

For each frequency obtained, the acoustic signal generation unit 105 calculates a frequency of a second harmonic corresponding to a corresponding one of the frequencies.

For example, when the frequencies obtained in step S101 are 210 Hz and 350 Hz, the acoustic signal generation unit 105 calculates a second harmonic corresponding to 210 Hz of 420 Hz, and a second harmonic corresponding to 350 Hz of 700 Hz.

(Step S103)

The acoustic signal generation unit 105 determines whether there is a frequency among the frequencies of the second harmonics calculated in step S102 that is higher than the maximum frequency for haptic perception. When none of the frequencies are higher than the maximum frequency, processing proceeds to step S104. When one or more of the frequencies are higher than the maximum frequency, processing proceeds to step S105.

For example, when the frequencies of second harmonics calculated in step S103 are 420 Hz and 700 Hz, the acoustic signal generation unit 105 determines that there is a frequency higher than the maximum frequency (500 Hz), and continues to step S105.

(Step S104)

For each frequency obtained, the acoustic signal generation unit 105 calculates a frequency of the harmonic next in order after the harmonic determined in step S103. The acoustic signal generation unit 105 then repeats step S103. Step S103 and step S104 are repeated until there is a frequency which exceeds the maximum frequency among the frequencies of the calculated harmonics.

(Step S105)

The acoustic signal generation unit 105 determines, as the fundamental frequency, a frequency corresponding to a harmonic at a frequency closest to the maximum frequency from among the frequencies of harmonics determined to be higher than the maximum frequency. For example, when the frequency of a harmonic determined to be higher than the maximum frequency is 700 Hz, the frequency of 350 Hz corresponding to the harmonic of 700 Hz is determined as the fundamental frequency.

(Step S106)

The acoustic signal generation unit 105 generates a plurality of harmonics that are at frequencies exceeding the maximum frequency and which correspond to the fundamental frequency determined in step S105.

For example, when the determined fundamental frequency is 350 Hz, the acoustic signal generation unit 105 generates harmonics at 700 Hz, 1050 Hz, ..., 350×n Hz, which are no less than 500 Hz, where n is an integer no less than 2.

(Step S107)

The acoustic signal generation unit 105 generates an acoustic signal having the plurality of harmonics generated in step S106. For example, when the frequencies of the generated plurality of harmonics are 700 Hz, 1050 Hz, ..., 350×n Hz, the acoustic signal generation unit 105 generates an acoustic signal having the harmonics at 350 Hz, 1050 Hz, ..., 350×n Hz.

It should be noted that the processes of steps S101 through S105 shown in FIG. 12 may be performed in advance before the touch position is obtained. In other words, the fundamental frequency used in the generation of the acoustic signal may be predetermined.

(Driving Signal Generation Unit 106)

The driving signal generation unit 106 generates a driving signal having the carrier signal generated by the carrier signal generation unit 104 and the acoustic signal generated by the acoustic signal generation unit 105. More specifically, the driving signal generation unit 106 generates a driving signal by adding together the carrier signal and the acoustic signal. In other words, the driving signal generation unit 106 generates a driving signal by combining the carrier signal and the acoustic signal. As a result, the driving signal includes a frequency component corresponding to the touch position and frequency components of the plurality of harmonics.

As Equation 4 shows, the driving signal generation unit 106, for example, generates, as the driving signal $s_D$, a sum of the carrier signal $s_c$ generated using Equation 1 and the acoustic signal $s_A$ generated using Equation 3.

[Math 4]

$$s_D(t) = s_C(t) + s_A(t) \qquad (4)$$
$$= \sin(2\pi F_c t) + \sum_{k=2}^{n} \sin(2\pi k F_b t)$$

Moreover, the driving signal generation unit 106 may generate a driving signal by summing the carrier signal and the acoustic signal with weighting. When the driving signal is generated by adding the carrier signal and the acoustic signal with equal weight, the energy of the sound of the driving signal increases, and there are instances when the vibration of the panel 101 becomes weak. As such, by summing the carrier signal and the acoustic signal with weighting, it is possible for the driving signal generation unit 106 to adequately adjust the energy of the sound. In this case, the driving signal generation unit 106 generates a driving signal using, for example, Equation 5.

[Math 5]

$$s_D(t) = r \sin(2\pi F_c t) + (1-r) \sum_{k=2}^{n} \sin(2\pi k F_b t) \qquad (5)$$

Here, r is a value greater than 0 and less than 1.

(Actuator 107)

The actuator 107 is driven by the driving signal generated by the driving signal generation unit 106 and provides haptic feedback to the user by vibrating the panel 101. In other words, the actuator 107 provides haptic feedback to the user by vibrating the panel 101 in accordance with the driving signal. That is to say, the actuator 107 imparts vibration indicating the driving signal on the panel 101.

In the first embodiment, the actuator 107 is applied on the surface of the panel 101. Moreover, the configuration of the actuator 107 is not particularly limited to a certain configuration, and for example may be a configuration which includes a piezoelectric element or a motor.

In other words, the vibrations imparted by the actuator 107 are transmitted from the position in which the actuator 107 is placed to the touch position. As such, haptic feedback is provided to the user at the touch position.

It should be noted that in the first embodiment, the actuator 107 includes the first actuator 107A and the second actuator 107B placed in different positions, but the actuator 107 may include three or more actuators. This makes it possible to drive the plurality of actuators according to an in-phase or reverse phase driving signal, and allows for more types of vibrations modes for the panel 101.

Moreover, the actuator 107 is not required to include a plurality of actuators. In other words, the actuator 107 may include only one actuator.

It should be noted that the actuator 107 may amplify the driving signal generated by the driving signal generation unit 106 using an amplifier then use the amplified driving signal for driving. By amplifying the driving signal using an amplifier, the driving signal generation unit 106 is capable of increasing the vibration of the panel and providing even stronger haptic feedback to the user.

Figure 13:
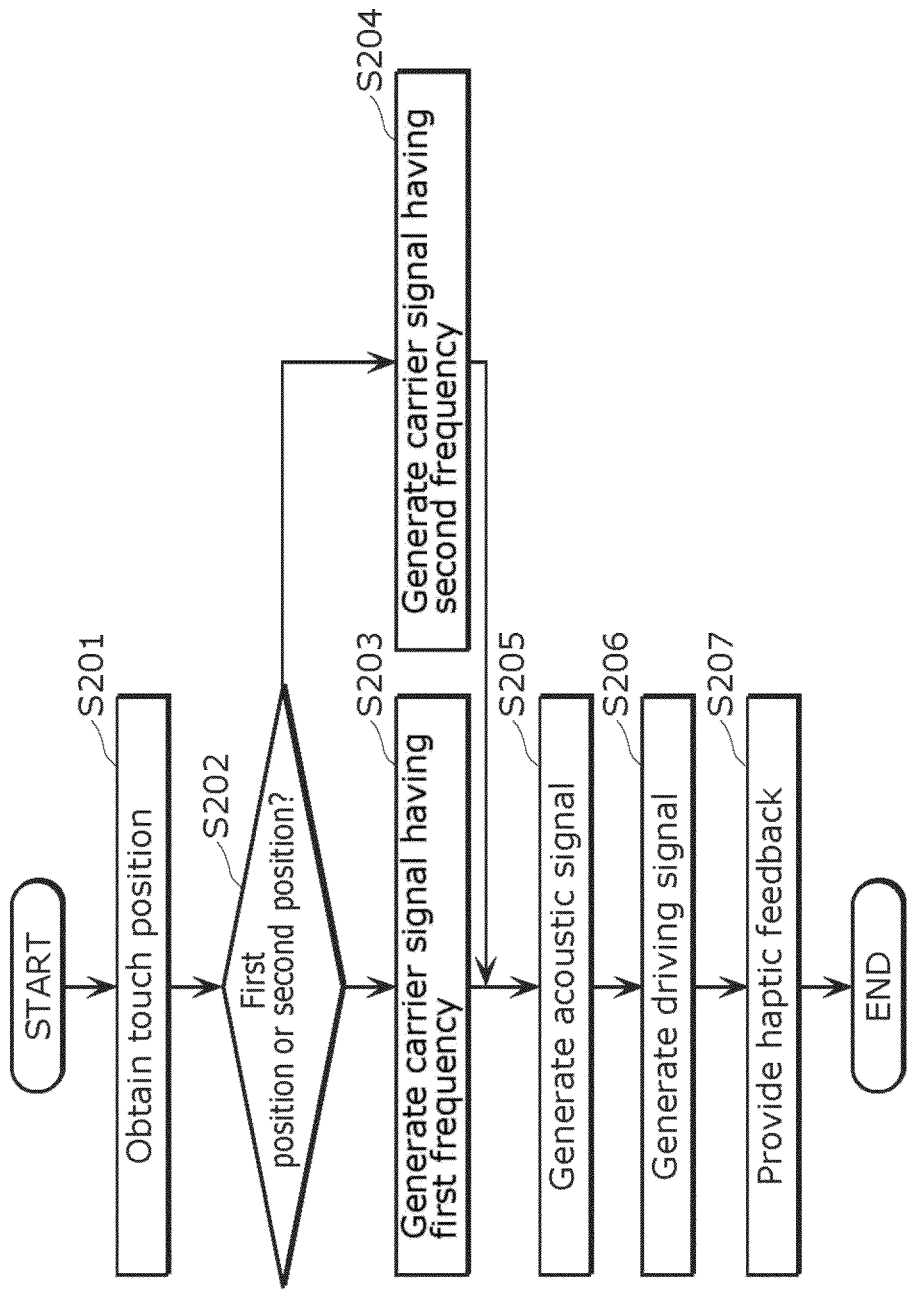
FIG. 13 is a flow chart showing operations performed by the haptic feedback device according to the first embodiment.

FIG. 13 is a flow chart showing operations performed by the haptic feedback device 100 according to the first embodiment. Operations performed by the haptic feedback device 100 will be described using FIG. 13. Here, it is assumed that the storage unit 103 stores a first frequency corresponding to a first position and a second frequency corresponding to a second position.

(Step S201)

The position obtaining unit 102 obtains a position touched on the panel 101 (touch position) by the user. More specifically, as FIG. 5 shows, the position obtaining unit 102 obtains coordinates of the touch position.

(Step S202)

The carrier signal generation unit 104 determines whether the touch position is the first position or the second position. More specifically, the carrier signal generation unit 104 determines whether the touch position is the first position or the second position by determining which of a plurality of regions defined by the information shown in FIG. 6 includes the touch position.

(Step S203)

The carrier signal generation unit 104 generates a carrier signal having a first frequency component corresponding to the first position when the touch position is the first position. For example, when the touch position is (50, 500), the carrier signal generation unit 104 refers to FIG. 6 and generates a carrier signal of 210 Hz.

(Step S204)

The carrier signal generation unit 104 generates a carrier signal having a second frequency component corresponding to the second position when the touch position is the second position. For example, when the touch position is (150, 500), the carrier signal generation unit 104 refers to FIG. 6 and generates a carrier signal of 350 Hz.

(Step S205)

The acoustic signal generation unit 105 generates an acoustic signal having a plurality of harmonics which correspond to at least one of the first frequency or the second frequency. The fundamental frequency may be predetermined by the method shown in FIG. 12, for example. In other words, in both the event that the touch position is the first position and the event that the touch position is the second position, the acoustic signal generation unit 105 generates an acoustic signal having a plurality of harmonics which correspond to the same fundamental frequency.

(Step S206)

The driving signal generation unit 106 generates a driving signal by adding together the carrier signal generated in step S203 or step S204 and the acoustic signal generated in step S205.

(Step S207)

The actuator 107 provides haptic feedback to the user by vibrating the panel 101 in accordance with the driving signal generated in step S206.

In this way, the haptic feedback device 100 is capable of providing haptic feedback to the user by executing the above-described steps S201 through S207 when, for example, a touch made by the user is detected.

It should be noted that in addition to the touch position, the position obtaining unit 102 may obtain the time at which the panel 101 was touched by the user in step S201.

It should be noted that in step S202, it is determined which of two positions (the first position or the second position) the touch position is, but it may be determined which of three or more positions the touch position is. In other words, the carrier signal generation unit 104 may determine which frequency the touch position corresponds to.

It should be noted that in step S203 and step S204, when the storage unit 103 stores phase information in addition to frequencies, the carrier signal generation unit 104 may generate a plurality of carrier signals of a frequency corresponding to the touch position and having phase relationship corresponding to the touch position. Here, the plurality of carrier signals are carrier signals for the plurality of actuators (the first actuator 107A and the second actuator 107B).

It should be noted that in steps S203 through S205, the carrier signal generation unit 104 and the acoustic signal generation unit 105 may determine a frequency corresponding to the touch position and a frequency of the plurality of harmonics, respectively, without generating the carrier signal and the acoustic signal, respectively. In this case, the driving signal generation unit 106 may generate, as the driving signal, a signal having a frequency component at a frequency determined by the carrier signal generation unit 104 and a plurality of frequency components at a frequency determined by the acoustic signal generation unit 105.

With the above-described first embodiment, regardless of whether the touch position is a first position or a second position, in either case, the haptic feedback device 100 is capable of generating a driving signal added with an acoustic signal having a plurality of harmonics corresponding to a predetermined fundamental frequency. Even if a fundamental frequency component is not included in a sound, if a harmonic corresponding to the fundamental frequency is included in the sound, the sound of the fundamental frequency is audible to humans (missing F0 phenomenon). As such, even if the touch position changes from the first position to the second position, the haptic feedback device 100 can make the sound of the fundamental frequency audible to a user, thereby making it possible to reduce the variation in acoustic noise from the change in touch position. Consequently, the haptic feedback device 100 can reduce the discomfort felt by the user due to this discontinuous change in acoustic noise.

Moreover, the haptic feedback device 100 is capable of using either the first frequency or the second frequency as the fundamental frequency. As such, the haptic feedback device 100 is capable of reducing the types of sounds audible by the user to two types—the sound of the fundamental frequency and the sound of the other of the first frequency and the second frequency plus the fundamental frequency—as well as reduce discomfort felt by the user.

Moreover, the haptic feedback device 100 is capable of generating, as the carrier signal, a signal having a resonance frequency component at a frequency corresponding to the touch position. As such, the haptic feedback device 100 is capable of more efficiently vibrating the panel using little energy.

Moreover, the haptic feedback device 100 is capable of using a frequency at which the panel resonates the strongest as the fundamental frequency. Generally, the greater the amplitude of the panel is, the louder sound perceived by the user is. As such, when a vibration of the frequency at which the panel resonates the most greatly is imparted to the panel followed by a vibration of a different resonance frequency, the haptic feedback device 100 is capable of causing the user to continuously hear the loudest perceived sound. As a result, the haptic feedback device 100 is capable of further reducing the variation in acoustic noise and reducing discomfort felt by the user.

Moreover, the haptic feedback device 100 is capable of using harmonics at a frequency higher than the maximum frequency, as the plurality of harmonics included in the acoustic signal. As such, the haptic feedback device 100 is capable of suppressing variation in haptic feedback in order to reduce variation in acoustic noise.

Moreover, the haptic feedback device 100 is capable of using a phase relation dependent on the touch position upon generation of the carrier signal for the plurality of actuators. As such, the haptic feedback device 100 is capable of increasing the variations of the carrier signal and effectively vibrating the panel.

First Variation of the First Embodiment

Next, the first variation of the first embodiment will be described.

As is described in the above-described first embodiment, the carrier signal is a signal for providing haptic feedback to the user. Moreover, the acoustic signal is a signal for reducing discomfort felt by the user by reducing discontinuous changes in the acoustic noise.

The discussion here will assume that the total energy of the driving signal, which is a signal for driving the actuator 107, is fixed. In this case, if the energy corresponding to the acoustic signal is increased, the energy corresponding to the carrier signal will decrease. As the energy corresponding to the carrier signal decreases, the signal strength for providing haptic feedback to the user weakens. In other words, if the energy corresponding to the acoustic signal is increased, discomfort felt by the user due to the discontinuous changes in acoustic noise will be reduced, but the haptic feedback provided to the user will also weaken.

As such, it is preferable that the energy corresponding to the acoustic signal is adjusted so that the energy required to reduce discomfort felt by the user is maintained while also being as low as possible. Particularly when the acoustic signal has many high-order harmonics, the proportion of energy corresponding to the acoustic signal in the total energy of the driving signal increases, and as such, adjustment of the energy corresponding to the acoustic signal is likely necessary.

As such, the haptic feedback device 100 according to the first variation reduces the energy corresponding to the acoustic signal while reducing discomfort felt by the user by generating an acoustic signal having a plurality of harmonics whose signal strengths weaken with increasing frequency.

Next, structural elements of the haptic feedback device 100 according to the first variation of the first embodiment different from those in the first embodiment will be described in detail. It is to be noted that since the haptic feedback device 100 according to the first variation has the same configuration as the haptic feedback device according to the first embodiment, depiction thereof in the Drawings is omitted.

(Acoustic Signal Generation Unit 105)

The acoustic signal generation unit 105 generates an acoustic signal having a plurality of harmonics whose signal strengths weaken with increasing frequency. In other words, in the first variation, the acoustic signal generation unit 105 adjusts the energy corresponding to the acoustic signal by adjusting the signal strength of each harmonic included in the acoustic signal.

More specifically, the acoustic signal generation unit 105, for example, adjusts the energy corresponding to the acoustic signal by a method of linearly or exponentially reducing the energy of the plurality of harmonics included in the acoustic signal.

Next, using a specific example, the method of exponentially reducing the energy of the plurality of harmonics included in the acoustic signal will be described. In order to exponentially reduce the energy of the plurality of harmonics included in the acoustic signal, the acoustic signal generation unit 105 generates an acoustic signal having a plurality of harmonics whose signal strengths weaken with increasing frequency, as is shown by Equation 6.

[Math 6]

$$s_A(t) = \sum_{k=2}^{n} w_k \sin(2\pi k F_b t) \quad (6)$$

$$w_k = \exp(-\alpha(k-1))$$

Here, $s_A$ is the acoustic signal, t is time, K is an integer no less than 2 and no more than n, $F_b$ is a frequency stored in the storage unit 103, and $\alpha$ is a constant. In Equation 6, the degree of reduction in amplitude when the frequency of the harmonic is increased is adjusted by adjusting the constant $\alpha$. In other words, the constant $\alpha$ is a value for adjusting the degree of reduction in energy.

Figure 14:
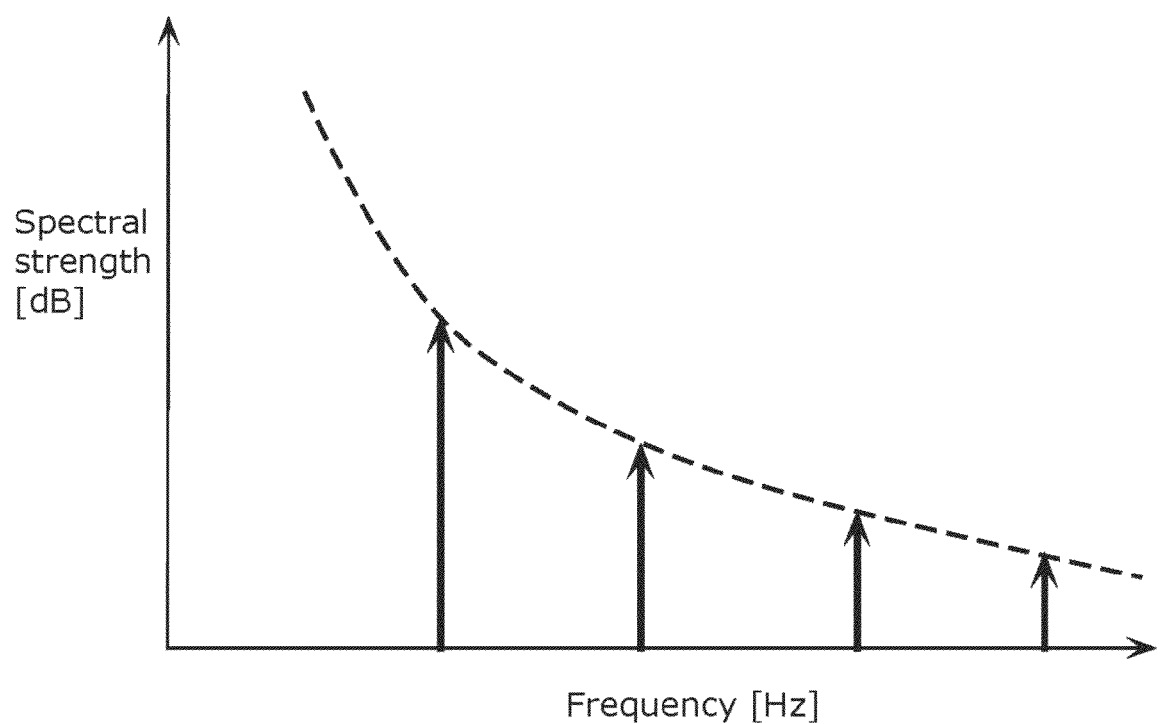
FIG. 14 shows an example of an acoustic signal generated by the acoustic signal generation unit according to the first variation of the first embodiment.

FIG. 14 shows an example of an acoustic signal generated by the acoustic signal generation unit 105 according to the first variation of the first embodiment. In FIG. 14, frequency is represented along the horizontal axis, and energy corresponding to frequency is represented along the vertical axis.

As FIG. 14 shows, when the acoustic signal includes four harmonics, each harmonic is adjusted so that spectral strength (signal strength or amplitude) decreases with increasing order of the harmonics. As a result, the overall strength of the acoustic signal decreases.

It should be noted that when adjustment of the strength of the acoustic signal is required, the acoustic signal generation unit 105 may remove, from among the plurality of harmonics included in the acoustic signal, high-order harmonics above a given order. For example, humans can generally perceive sound as an auditory sensation in the 1 to 2 kHz band well. As such, the acoustic signal generation unit 105 may remove, from the acoustic signal, harmonics that are 2 kHz or higher. This allows the acoustic signal generation unit 105 to reduce the influence of the reduction in acoustic signal strength on auditory sensation.

It should be noted that the acoustic signal generation unit 105 may adjust the strength of the acoustic signal such that the energy per frequency band is varied. This allows the acoustic signal generation unit 105 to generate an acoustic signal having a tone similar to a wind instrument.

It should be noted that the acoustic signal generation unit 105 may adjust the strength of the acoustic signal so that energy varies depending on time. This allows the acoustic signal generation unit 105 to generate an acoustic signal having a natural tone different from a synthetic sound (for example, the sound of a buzzer).

It should be noted that when the acoustic signal generation unit 105 determines the frequencies for the plurality of harmonics included in the acoustic signal, the driving signal generation unit 106 may generate an acoustic signal having a plurality of harmonics whose signal strengths weaken with increasing frequency.

With the above, the haptic feedback device 100 according to the first variation is capable of generating an acoustic signal having a plurality of harmonics whose signal strengths weaken as frequency increases. As such, the haptic feedback device 100 is capable of relatively reducing the strength of the high frequency component at which vibration of the panel requires great strength, and reduce the energy required to reduce variation in acoustic noise.

Second Embodiment

The second embodiment differs from the first embodiment in that the driving signal is modulated. Next, the second embodiment will be described focusing on the portions that differ from the first embodiment.

Figure 15:
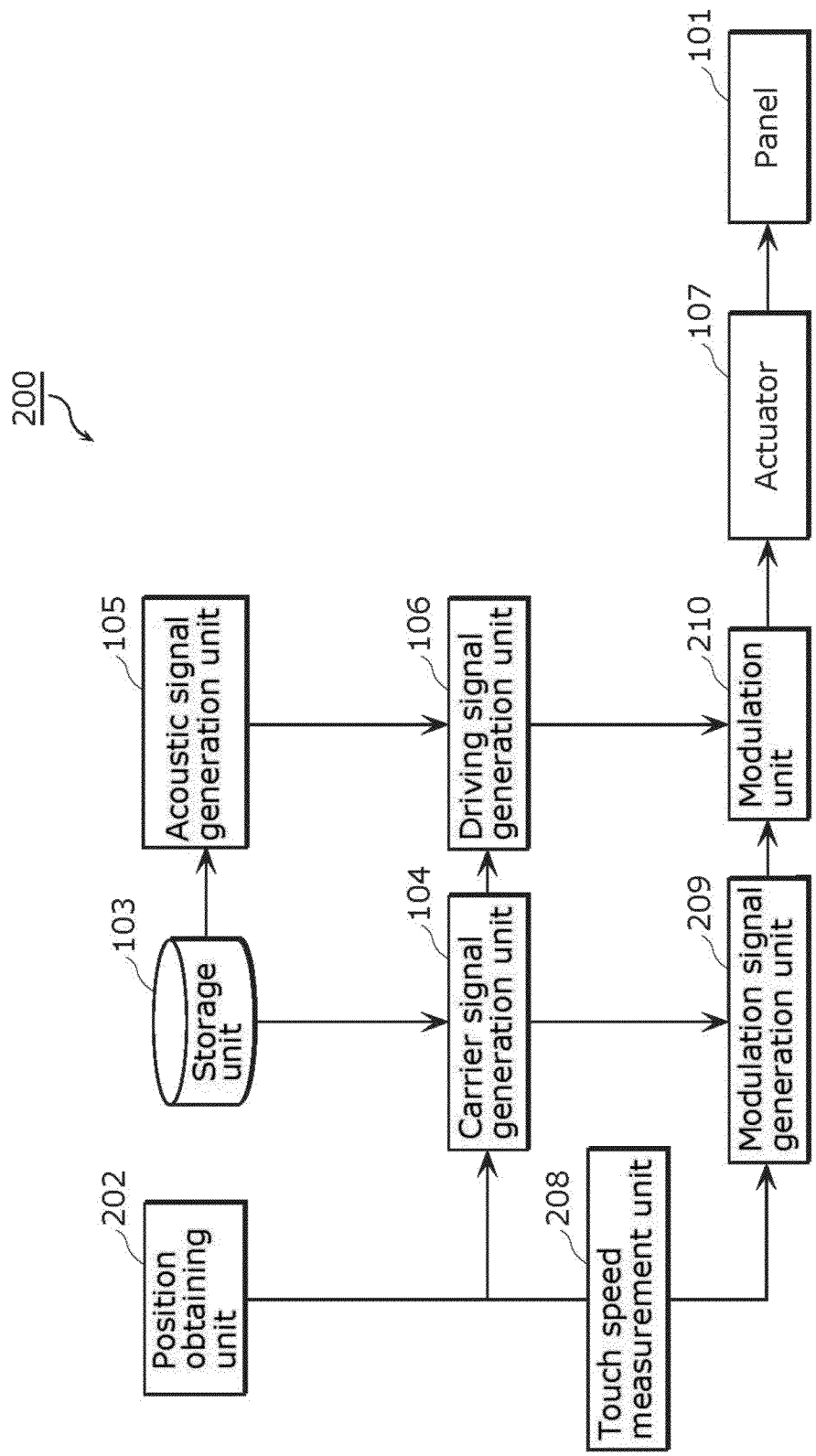
FIG. 15 is a block diagram of a haptic feedback device according to the second embodiment.

FIG. 15 is a block diagram of a haptic feedback device 200 according to the second embodiment. In FIG. 15, the structural elements that are the same as those in FIG. 4 share the same reference numerals, and as such, explanations thereof are omitted. The haptic feedback device 200 includes the panel 101, the storage unit 103, the carrier signal generation unit 104, the acoustic signal generation unit 105, the driving signal generation unit 106, the actuator 107, a position obtaining unit 202, a touch speed measurement unit 208, a modulation signal generation unit 209, and a modulation unit 210.

(Position Obtaining Unit 202)

The position obtaining unit 202 obtains, in addition to the touch position, a time of the touch made on the panel 101 (touch time) by the user.

(Touch Speed Measurement Unit 208)

The touch speed measurement unit 208 measures the speed of a touch made by the user (touch speed) using the touch position and the touch time obtained by the position obtaining unit 202.

For example, the touch speed measurement unit 208 calculates, using Equation 7, the touch speed ($v_x$, $v_y$) using the second touch position ($x_t$, $y_t$) obtained at the touch time t, and the first touch position ($x_{t-1}$, $y_{t-1}$) obtained at the touch time (t−Δt).

[Math 7]

$$v_x = \frac{x_t - x_{t-1}}{\Delta t} \quad (7)$$
$$v_y = \frac{y_t - y_{t-1}}{\Delta t}$$

Here, $v_x$ is the touch speed in the horizontal direction, and $v_y$ is the touch speed in the vertical direction.

(Modulation Signal Generation Unit 209)

The modulation signal generation unit 209 generates a modulation signal having a frequency component that increases with the touch speed measured by the touch speed measurement unit 208. This modulation signal is a signal for modulating the driving signal for the actuator 107.

Next, the modulation signal generation method when the haptic feedback provided to the user expresses, for example, roughness, will be described.

Figure 16:
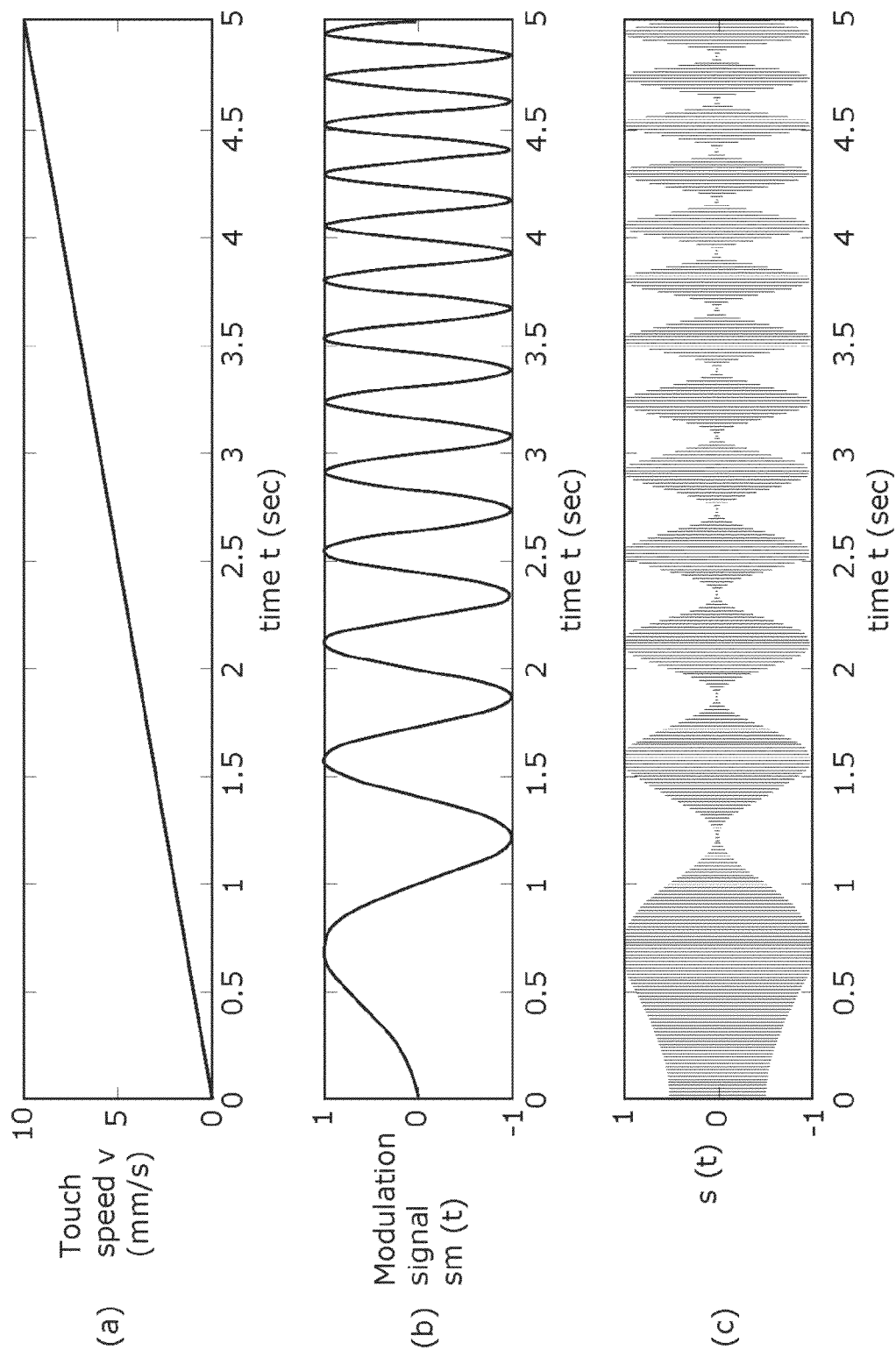
FIG. 16 is a graph showing an example of the touch speed, the modulation signal, and the modulated driving signal according to the second embodiment.

FIG. 16 shows an example of the touch speed, the modulation signal, and the modulated driving signal. In (a) in FIG. 16, the touch speed from 0 seconds to 5 seconds changes at a constant acceleration from 0 mm/s to 10 mm/s. In this case, the modulation signal generation unit 209 generates the modulation signal like that shown in (b) of FIG. 16. More specifically, the modulation signal generation unit 209 generates the modulation signal using Equation 8.

[Math 8]

$$s_m(t) = \sum_{i=1}^{n} A_i \sin(2\pi\lambda_i v(t)t) \quad (8)$$

Here, $s_m$ is the modulation signal, $A_i$ is the strength of the i-th spatial frequency, $\lambda$(1/mm) is the spatial frequency of a texture image displayed on the panel 101. In the example shown in FIG. 17, since the projections and recessions of the texture image are positioned at 2 mm intervals, a single spatial frequency $\lambda$=0.5 (n=1) is obtained. Here, the modulation signal generation unit 209 generates a modulation signal having a sine wave of a frequency proportionate to the touch speed.

Figure 17:
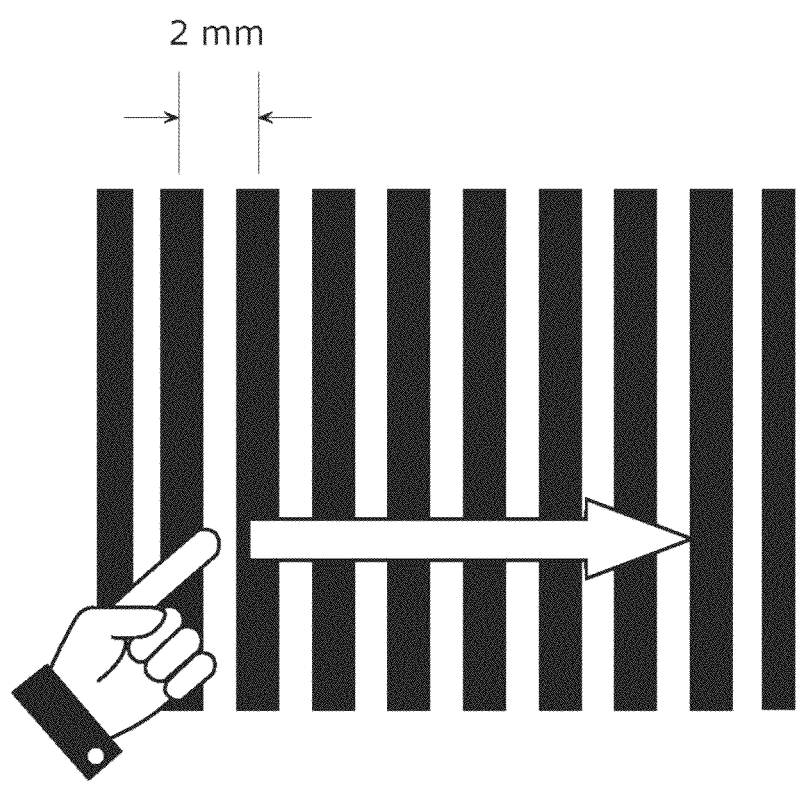
FIG. 17 is an example of an image displayed on the panel.

In the case of FIG. 17, since the texture is in the form of a stripe pattern extending in the vertical direction (Y-axis direction), the touch speed used in Equation 8 is the speed $v_x$ of the user's touch tracing in a horizontal direction relative to the extending direction of the stripe pattern.

The greater the user's touch speed, the more stripes are passed over per unit time in the texture in FIG. 17, and as such, the modulation signal generation unit 209 generates a modulation signal having a higher frequency component. Conversely, the modulation signal generation unit 209 generates a modulation signal having a frequency component that decreases with decreasing touch speed.

(Modulation Unit 210)

The modulation unit 210 modulates the driving signal generated by the driving signal generation unit 106 using the modulation signal generated by the modulation signal generation unit 209. In other words, the modulation unit 210 performs amplitude modulation or frequency modulation on the driving signal using the modulation signal. More specifically, the modulation unit 210 may perform amplitude modulation on the driving signal using, for example, Equation 9.

[Math 9]

$$s(t) = s_m(t)s_D(t) \quad (9)$$
$$= \sin(2\pi\lambda v(t)t)\left(\sin(2\pi F_c t) + \sum_{k=2}^{n} \sin(2\pi k F_b t)\right)$$

Moreover, the modulation unit 210 may perform amplitude modulation on the driving signal using, for example, Equation 10.

[Math 10]

$$s(t) = \frac{1 + s_m(t)}{2} s_D(t) \quad (10)$$
$$= \frac{1 + \sin(2\pi\lambda v(t)t)}{2}\left(\sin(2\pi F_c t) + \sum_{k=2}^{n} \sin(2\pi k F_b t)\right)$$

(c) in FIG. 16 shows an example of the modulated driving signal. As (c) in FIG. 16 shows, the modulation unit 210 is capable of performing amplitude modulation on the driving signal by multiplying (i) the modulation signal having a frequency component dependent on the touch speed and (ii) the driving signal for driving the actuator 107.

Figure 18:
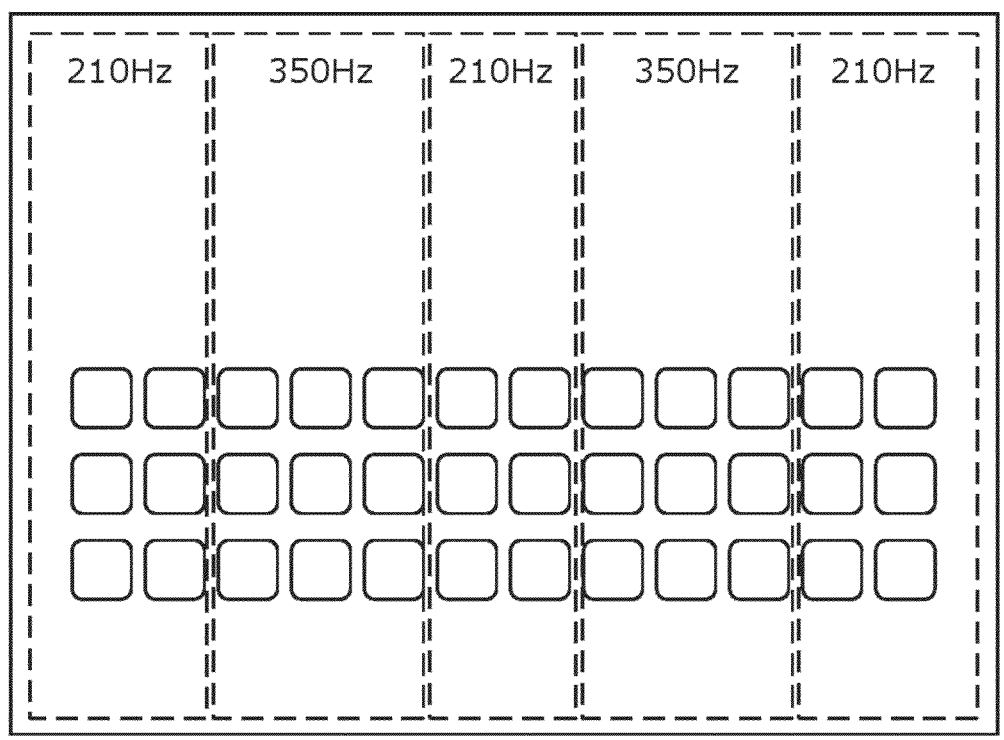
FIG. 18 is an example of an image displayed on the panel.
Figure 19A:
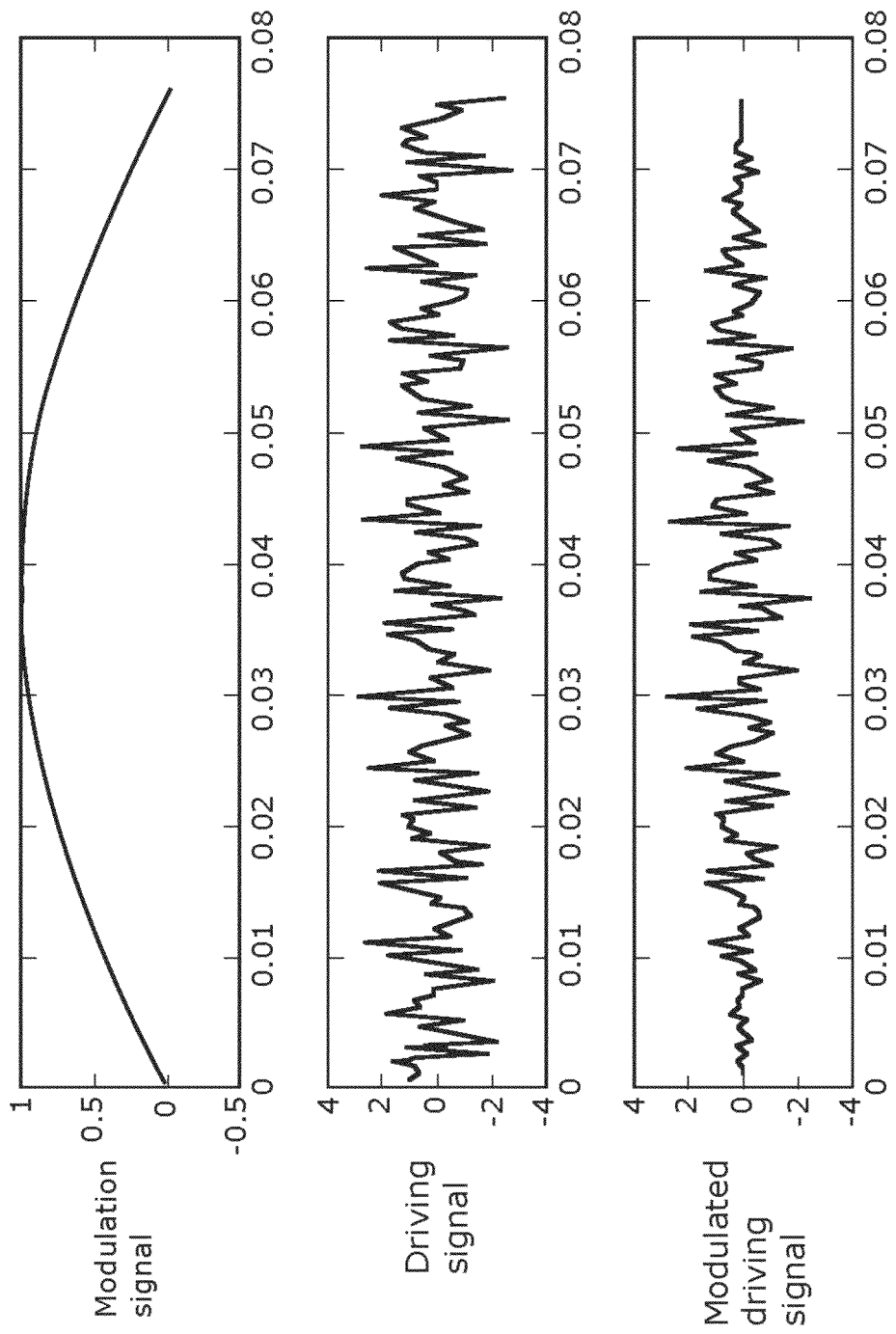
FIG. 19A shows an example of the modulation signal, the driving signal, and the modulated driving signal according to the second embodiment.

It should be noted that while the second embodiment is exemplified using a case in which an image like the one shown in FIG. 17 is touched, in the second embodiment, the driving signal may be modulated when an image in which buttons are arranged vertically is touched, such as the image of the software keyboard shown in FIG. 18. In this case, the modulation signal generation unit 209 generates a modulation signal having a half wavelength sine wave frequency that corresponds to the button at the touch position, for example. It should be noted that the carrier signal generation unit 104 generates a carrier signal having a frequency component corresponding to the button. For example, when the touch position is at a button corresponding to 210 Hz, the modulation unit 210 modulates the driving signal as FIG. 19A shows. Moreover, for example, when the touch position is at a button corresponding to 370 Hz, the modulation unit 210 modulates the driving signal as FIG. 19B shows.

With this, it is possible to reduce the variation in acoustic noise based on the position of the button touched, and reduce auditory discomfort felt when a button is continuously pressed. Moreover, in addition to when a button is pressed, it is also possible to reduce variation in acoustic noise in the case that the user makes a tracing action on the panel 101 while searching for a button as well.

Hereinbefore the haptic feedback device according to one or more aspect was described based on exemplary embodiments, but the present invention is not limited to these exemplary embodiments. Various modifications of the exemplary embodiments as well as embodiments resulting from combinations of constituent elements of the different exemplary embodiments that may be conceived by those skilled in the art are intended to be included within the scope of the one or more aspect as long as these do not depart from the essence of the present invention.

For example, in the above embodiments, the haptic feedback device includes a storage unit, but the haptic feedback device is not required to include a storage unit. When the haptic feedback device does not include a storage unit, the haptic feedback device may obtain a frequency corresponding to the touch position from, for example, an external storage device.

Moreover, in the second embodiment, the haptic feedback device modulates driving signal, but the haptic feedback device may modulate the carrier signal and the acoustic signal. In this case, the haptic feedback device may generate the driving signal by adding together the modulated carrier signal and the modulated acoustic signal.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the haptic feedback device according to each of the embodiments is a program described below.

That is, the program causes the computer to execute a haptic feedback method of providing haptic feedback to a user touching a panel, the haptic feedback method including: obtaining a position touched on the panel by the user; generating a carrier signal having a first frequency component when the position touched by the user is a first position, and generating a carrier signal having a second frequency component when the position touched by the user is a second position; generating an acoustic signal having a plurality of harmonics which correspond to a predetermined fundamental frequency; generating a driving signal by adding together the carrier signal and the acoustic signal; and providing haptic feedback to the user by vibrating the panel in accordance with the driving signal.

INDUSTRIAL APPLICABILITY

The haptic feedback device according to one aspect of the present invention is capable of providing haptic feedback to a user touching a panel, and as such is applicable in devices having display panels, such as televisions, digital still cameras, digital movie cameras, personal computers, portable information devices, and cellular phones.

REFERENCE SIGNS LIST

100, 200 haptic feedback device
101 panel
102, 202 position obtaining unit
103 storage unit
104 carrier signal generation unit
105 acoustic signal generation unit
106 driving signal generation unit
107 actuator
107A first actuator
107B second actuator
208 touch speed measurement unit
209 modulation signal generation unit
210 modulation unit
301 region
302 region

The invention claimed is:
1. A haptic feedback device which provides haptic feedback to a user touching a panel, the haptic feedback device comprising:

the panel;

a position obtaining unit configured to obtain a position touched on the panel by the user;

a carrier signal generation unit configured to generate a carrier signal having a first frequency component when the position touched by the user is a first position, and generate a carrier signal having a second frequency component when the position touched by the user is a second position, the second frequency component being different from the first frequency component;

an acoustic signal generation unit configured to generate an acoustic signal having a plurality of harmonics which correspond to a predetermined fundamental frequency, the acoustic signal generated when the touch position is the first position being identical to the acoustic signal generated when the touch position is the second position;

a driving signal generation unit configured to generate a driving signal by adding together the carrier signal and the acoustic signal; and an actuator which provides haptic feedback to the user by vibrating the panel in accordance with the driving signal.

2. The haptic feedback device according to claim 1, wherein the fundamental frequency is equal to either the first frequency or the second frequency.

3. The haptic feedback device according to claim 2, wherein the first frequency is one of a plurality of resonance frequencies of the panel, and the second frequency is a different one of the plurality of resonance frequencies of the panel.

4. The haptic feedback device according to claim 3, wherein the fundamental frequency is a frequency at which the panel resonates strongest among the plurality of resonance frequencies.

5. The haptic feedback device according to claim 1, wherein the plurality of harmonics are harmonics at frequencies higher than a maximum frequency predetermined as an upper limit for frequencies of vibrations to be haptically perceived by the user.

6. The haptic feedback device according to claim 1, wherein the actuator includes a first actuator and a second actuator placed in different positions, the carrier signal generation unit is configured to:
when the position touched is the first position, generate a carrier signal for the first actuator and a carrier signal for the second actuator having a phase relation corresponding to the first position; and when the position touched is the second position, generate a carrier signal for the first actuator and a carrier signal for the second actuator having a phase relation corresponding to the second position, and the driving signal generation unit is configured to generate a driving signal for the first actuator by adding together the carrier signal for the first actuator and the acoustic signal, and generate a driving signal for the second actuator by adding together the carrier signal for the second actuator and the acoustic signal.

7. The haptic feedback device according to claim 1, wherein the acoustic signal generation unit is configured to generate the acoustic signal having the plurality of harmonics whose signal strengths decrease with increasing frequency.

8. A haptic feedback method of providing haptic feedback to a user touching a panel, the haptic feedback method comprising:

obtaining a position touched on the panel by the user;

generating a carrier signal having a first frequency component when the position touched by the user is a first position, and generating a carrier signal having a second frequency component when the position touched by the user is a second position, the second frequency component being different from the first frequency component;

generating an acoustic signal having a plurality of harmonics which correspond to a predetermined fundamental frequency, the acoustic signal generated when the touch position is the first position being identical to the acoustic signal generated when the touch position is the second position;

generating a driving signal by adding together the carrier signal and the acoustic signal; and providing haptic feedback to the user by vibrating the panel in accordance with the driving signal.

9. A non-transitory computer-readable recording medium having a computer program recorded thereon for causing a computer to execute the haptic feedback method according to claim 8.

* * * * *